United States Patent
Morisaki

(10) Patent No.: US 9,380,409 B2
(45) Date of Patent: Jun. 28, 2016

(54) INFORMATION PROVIDING SYSTEM, INFORMATION PROVIDING METHOD, AND INFORMATION PROVIDING SERVER

(75) Inventor: Mitsunori Morisaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1159 days.

(21) Appl. No.: 13/126,008

(22) PCT Filed: Oct. 29, 2009

(86) PCT No.: PCT/JP2009/005722
§ 371 (c)(1),
(2), (4) Date: Apr. 26, 2011

(87) PCT Pub. No.: WO2010/052861
PCT Pub. Date: May 14, 2010

(65) Prior Publication Data
US 2011/0199206 A1 Aug. 18, 2011

(30) Foreign Application Priority Data
Nov. 4, 2008 (JP) .................................. 2008-283032

(51) Int. Cl.
  G08B 1/08 (2006.01)
  H04W 4/02 (2009.01)
  H04W 4/20 (2009.01)
  (Continued)

(52) U.S. Cl.
  CPC ...... *H04W 4/02* (2013.01); *H04W 4/20* (2013.01); *H04M 11/04* (2013.01); *H04W 64/00* (2013.01)

(58) Field of Classification Search
  CPC ... H04W 4/02; H04W 52/0254; H04W 64/00; H04W 12/06; H04W 24/00; H04W 40/00; H04W 4/12; H04W 52/46; H04W 84/18; H04W 92/18
  See application file for complete search history.

(56) References Cited

U.S. PATENT DOCUMENTS

| 6,434,479 | B1 * | 8/2002 | Kondou et al. ............... 701/516 |
| 6,549,625 | B1 * | 4/2003 | Rautila ................. G01S 5/0045 |
| | | | 380/258 |
| 7,956,800 | B2 * | 6/2011 | Fujiwara et al. ......... 342/357.42 |

(Continued)

FOREIGN PATENT DOCUMENTS

| JP | 2002351905 A | 12/2002 |
| JP | 2003061125 A | 2/2003 |

(Continued)

OTHER PUBLICATIONS

International Search Report for PCT/JP2009/005722 mailed Dec. 2009.

*Primary Examiner* — Kerri McNally
*Assistant Examiner* — Renee Dorsey

(57) ABSTRACT

A positioning terminal (10) including a positioning function transmits location identifying information (IL) received from a positioning infrastructure (30), and transmits destination designating information for designating a destination of location-related information generated by an information generating unit (120) to an information providing server (100). With this arrangement, a user can receive the location-related information through a display terminal (20) not including a positioning function, without advance registration of a mapping table associating the positioning terminal (10) with the display terminal (20) in the information providing server (100). In this manner, the usability of an information providing system that provides location-related information related to locations is improved.

22 Claims, 19 Drawing Sheets

(51) Int. Cl.
*H04M 11/04* (2006.01)
*H04W 64/00* (2009.01)

(56) References Cited

U.S. PATENT DOCUMENTS

| | | | |
|---|---|---|---|
| 8,005,489 B2* | 8/2011 | Fransioli | H04L 29/12311 455/456.1 |
| 8,204,686 B2* | 6/2012 | Jung et al. | 701/516 |
| 2003/0014492 A1* | 1/2003 | Premutico | 709/206 |
| 2003/0022676 A1* | 1/2003 | Nakamoto et al. | 455/456 |
| 2004/0239530 A1* | 12/2004 | Izumi et al. | 340/990 |
| 2005/0014493 A1* | 1/2005 | Ford | 455/418 |
| 2006/0063540 A1* | 3/2006 | Beuck | 455/456.3 |
| 2008/0019564 A1* | 1/2008 | Murata et al. | 382/103 |

FOREIGN PATENT DOCUMENTS

| | | |
|---|---|---|
| JP | 2003308326 A | 10/2003 |
| JP | 2005107827 A | 4/2005 |
| JP | 2008052601 A | 3/2008 |

* cited by examiner

FIG. 2

| LOCATION L | LOCATION-RELATED INFORMATION CT |
|---|---|
| 000001 | Index.html |
| 000002 | Floor1.html |
| 000003 | Map.jpg |
| | Test.wav |
| 000004 | Movie1.avi |

FIG. 3

| POSITIONING TERMINAL IDENTIFYING INFORMATION IDP | LOCATION L | LOCATION CALCULATION TIME TP |
|---|---|---|
| 0001 | 000001 | 2008/9/2 11:11:11 |
| 0002 | 000002 | 2008/9/1 12:12:12 |

FIG. 4
(A)
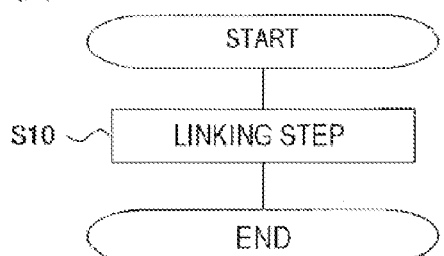
(B)
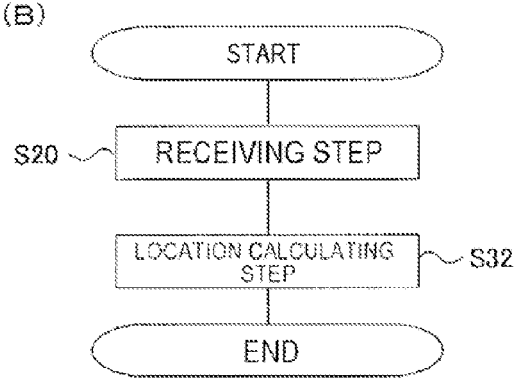
(C)
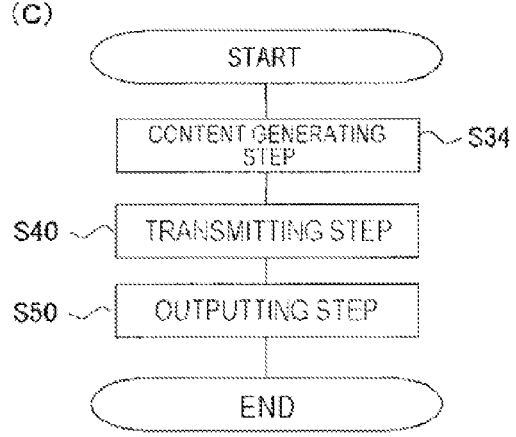

FIG. 10

| POSITIONING TERMINAL IDENTIFYING INFORMATION IDP | DISPLAY TERMINAL IDENTIFYING INFORMATION IDD | RECEPTION TIME TL | ACCESS TIME TA |
|---|---|---|---|
| 0001 | 10001 | 2008/10/2 10:11:11 | 2008/10/2 11:11:11 |
| (0002) | (10002) | 2008/10/1 10:10:10 | 2008/10/1 12:12:12 |

INFORMATION PROVIDING SYSTEM, INFORMATION PROVIDING METHOD, AND INFORMATION PROVIDING SERVER

TECHNICAL FIELD

The present invention relates to an information providing system, an information providing method, an information providing server, and a computer program for the information providing server.

BACKGROUND ART

In recent years, large amounts of information of various kinds are provided through the wide use of the Internet, and it has become difficult to promptly retrieve information requested by a user. The large amounts of information contain information that has a meaning in being distributed at the current location of each user. Therefore, there is a demand for distribution of location-dependent information to users.

Concerning such a type of technique, The GPS (Global Positioning System) has been installed in portable telephone devices based on mandatory function that a portable telephone device notifies of the caller location information in emergency calls, thereby there is a service to provide location-related information to a terminal having a positioning function.

Also, there have been systems designed for providing location-related information concerning the locations of users to terminals (user terminals) not having a positioning function such as the GPS, using location information supplied from terminals (positioning terminals) having a positioning function, as disclosed in Patent Documents 1 and 2.

In each system disclosed in Patent Documents mentioned below, a mapping table that associates user terminals with positioning terminals is stored beforehand in an information providing server, and location-related information generated in accordance with location information supplied from positioning terminals is distributed to the corresponding user terminals.

RELATED ART DOCUMENTS

Patent Documents

Patent Document 1
Japanese Laid-Open Patent Publication No. 2003-61125
Patent Document 2
Japanese Laid-Open Patent Publication No. 2002-351905

SUMMARY OF THE INVENTION

In each system disclosed in the above patent documents, however, user terminals cannot receive location-related information, unless user terminals that require information distribution are associated with positioning terminals and are registered beforehand in a server.

Therefore, the usability of information providing system has plenty room for improvement, as users who own general-purpose user terminals cannot obtain location-related information with the use of special-purpose positioning terminals suitable for respective locations at a destination.

An information providing system of the present invention including: a first portable terminal that has a positioning function and outputs location identifying information for identifying a location; a second portable terminal that does not have a positioning function but receives and outputs location-related information that is information related to the location; and an information providing server that provides the location-related information to the second portable terminal, the location-related information being related to the location identified based on the location identifying information. The information providing server includes: a receiving unit that receives destination designating information for designating a destination of the location-related information from the second portable terminal, and receives the location identifying information from the first portable terminal; an information generating unit that generates the location-related information related to the location of the first portable terminal identified by the received location identifying information; and a transmitting unit that transmits the generated location-related information to the destination, based on the received destination designating information.

An information providing method of the present invention, which is a method of providing location-related information that is information related to a location, and including: receiving location identifying information for identifying a location from a first portable terminal including a positioning function and outputting the location identifying information; receiving destination designating information for designating a destination of the location-related information from a second portable terminal receiving and outputting the location-related information, not including a positioning function; generating the location-related information related to the location of the first portable terminal identified by the received location identifying information; transmitting the generated location-related information to the destination, based on the received destination designating information; and receiving and outputting the transmitted location-related information at the second portable terminal.

An information providing server of the present invention including: a receiving unit that receives location identifying information for identifying a location from a first portable terminal including a positioning function and outputting the location identifying information, and receives destination designating information for designating a destination of the location-related information from a second portable terminal receiving and outputting location-related information, and not including a positioning function; an information generating unit that generates the location-related information related to the location of the first portable terminal identified by the received location identifying information; and a transmitting unit that transmits the generated location-related information to the destination, based on the received destination designating information.

A computer program of the present invention which is a computer program for an information providing server providing location-related information that is information related to a location. The computer program causes the information providing server to perform: a receiving process to receive location identifying information for identifying the location from a first portable terminal including a positioning function and outputting the location identifying information and receive destination designating information for designating a destination of the location-related information from a second portable terminal receiving and outputting the location-related information, and not including a positioning function; an information generating process to generate the location-related information related to the location of the first portable terminal identified by the received location identifying information; and a transmitting process to transmit the generated location-related information to the destination, based on the received destination designating information.

It should be noted that the respective components of the present invention are designed to realize the respective functions. For example, those components may be realized by special-purpose hardware designed for executing predetermined functions, an information processing device having the predetermined functions provided by a computer program, the predetermined functions realized in an information processing device by a computer program, any combinations of the hardware, device and functions, and the like.

The components of the present invention are not necessarily independent of one another. For example, two or more of the components may be formed as a single member, a single component may be formed by two or more members, a component may be part of another component, or part of a component may overlap with part of another component.

The procedures according to the information providing method of the present invention are described in sequential order, but the sequential order does not necessarily limit the order of execution of the procedures. When the information providing method of the present invention is implemented, the order of procedures may be changed, as long as there is no adverse influence on the contents thereof.

Further, according to the information providing method of the present invention, the procedures are not necessarily carried out in different timings from one another. For example, a procedure may be carried out while another procedure is being carried out, or the timing of a procedure may partially or entirely overlap with the timing of another procedure.

Meanwhile, the information providing server of the present invention may be embodied by hardware constructed by general-purpose devices such as a CPU (Central Processing unit), a ROM (Read Only Memory), a RAM (Random Access Memory), and an interface unit, or a special-purpose logic circuit designed for performing predetermined information processing operations, or a combination of the hardware and the logic circuit.

In the present invention, causing an information providing server to perform various operations according to a computer program also means causing the information providing server to control operations of various devices.

According to the information providing technique of the present invention, location identifying information that is output from a first portable terminal having a positioning function, and destination designating information for designating a destination of location-related information are transmitted to an information providing server. With this arrangement, a user may receive the location-related information through the second portable terminal not having a positioning function, without advance registration of a mapping table associating the first portable terminal with the second portable terminal in the information providing server.

BRIEF DESCRIPTION OF THE DRAWINGS

The above and other objects, features and advantages of the present invention will become more apparent from the following description of preferred exemplary embodiments taken in conjunction with the accompanying drawings.

FIG. 2 is a diagram representing an example of a content table stored in the content holding unit;

FIG. 3 is a diagram representing an example of a location table about the locations of positioning terminals stored in the location managing unit;

FIGS. 4(A) through 4(C) are flowcharts of the information providing method according to the first exemplary embodiment;

FIG. 10 is a diagram representing an example of a link table stored in a storage unit according to the second exemplary embodiment;

DESCRIPTION OF EXEMPLARY EMBODIMENTS

Figure 1:
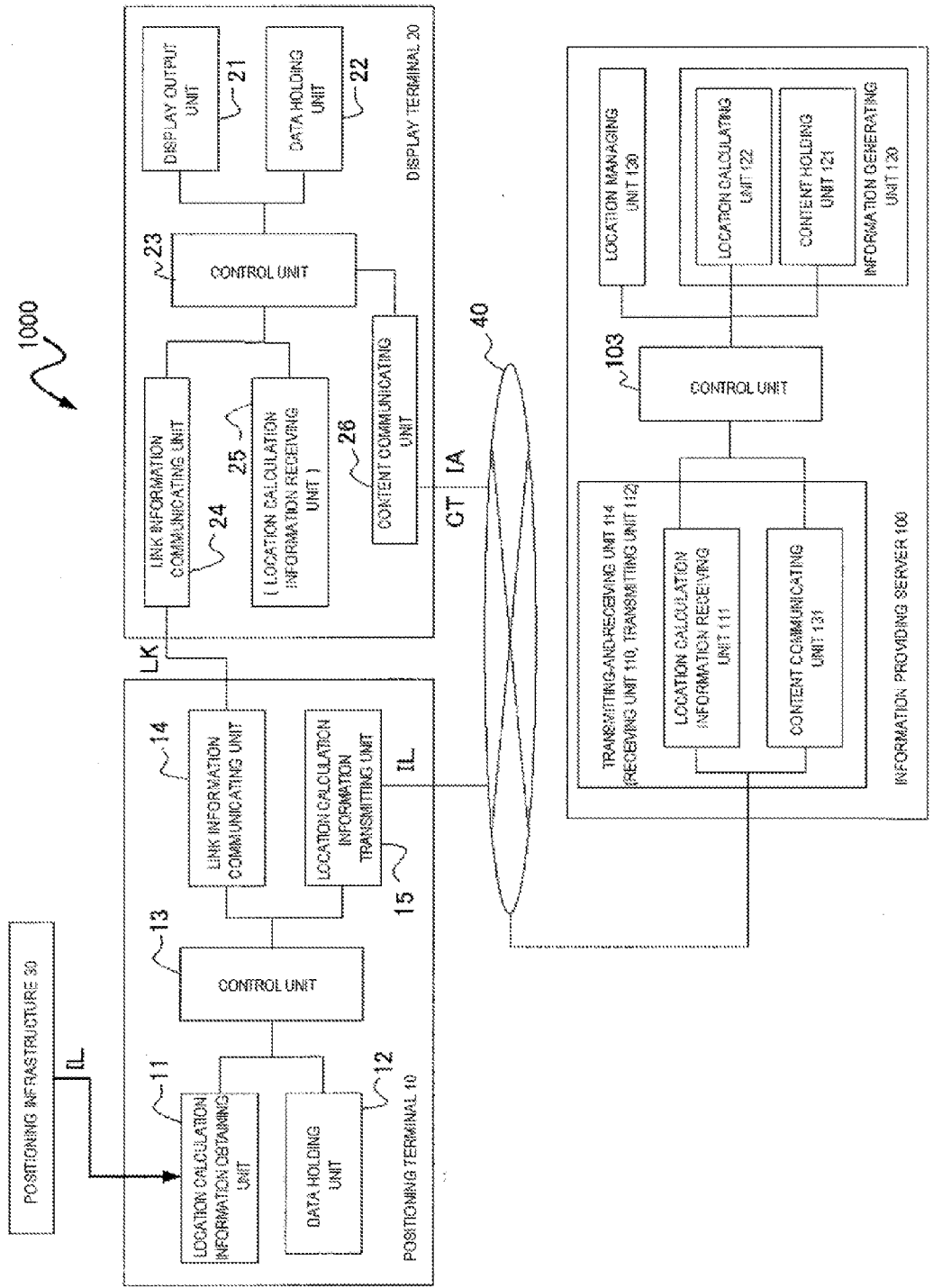
FIG. 1 is a functional block diagram of an information providing server according to a first exemplary embodiment of the present invention and an information providing system including the information providing server.

The following is a description of exemplary embodiments of the present invention, with reference to the accompanying drawings. In all the drawings, like components are denoted by like reference numerals, and explanation of them will not be repeated.

First Exemplary Embodiment

FIG. 1 is a functional block diagram of an information providing server 100 according to a first exemplary embodiment of the present invention and an information providing system 1000 including the information providing server 100. First, an outline of the information providing system 1000 of this exemplary embodiment is described.

The information providing system 1000 of this exemplary embodiment includes: a first portable terminal (a positioning terminal 10) that has a positioning function and outputs location identifying information IL for identifying a location L; a second portable terminal (a display terminal 20) that does not have a positioning function, but receives and outputs location-related information CT that is information related to the location L; and the information providing server 100 that provides the second portable terminal (the display terminal 20) with the location-related information CT related to the location L identified based on the location identifying information IL.

The information providing server 100 includes a receiving unit 110, an information generating unit 120, and a transmitting unit 112. The receiving unit 110 receives destination designating information IA for designating the destination DS of the location-related information CT from the first portable terminal (the positioning terminal 10) or the second portable terminal (the display terminal 20). The receiving unit 110 also receives the location identifying information IL from the first portable terminal (the positioning terminal 10) or the second portable terminal (the display terminal 20).

The information generating unit 120 generates the location-related information CT related to the location L of the first portable terminal (the positioning terminal 10) identified by the received location identifying information IL. The transmitting unit 112 transmits the generated location-related information CT to the destination DS, based on the received destination designating information IA.

That is, the information providing server 100 configuring the information providing system 1000 of this exemplary embodiment includes: the receiving unit 110 that receives the destination designating information IA for designating the destination DS of the location-related information CT and the location identifying information IL from the positioning terminal 10 that has the positioning function and outputs the location identifying information IL for identifying the location L, or the display terminal 20 that does not have a positioning function and receives and outputs the location-related information CT that is the information related to the location L; the information generating unit 120 that generates the location-related information CT related to the location L of the positioning terminal 10 identified by the received location identifying information IL; and the transmitting unit 112 that transmits the generated location-related information CT to the destination DS based on the received destination designating information IA.

Here, the receiving unit 110 receiving the destination designating information IA and the location identifying information IL from the positioning terminal 10 or the display terminal 20, which includes the following modes:

1) Receiving the destination designating information IA from the positioning terminal 10, and receiving the location identifying information IL from the display terminal 20.

2) Receiving the location identifying information IL from the positioning terminal 10, and receiving the destination designating information IA from the display terminal 20.

3) Receiving both the location identifying information IL and the destination designating information IA from one of the positioning terminal 10 and the display terminal 20.

4) Receiving both the location identifying information IL and the destination designating information IA from one of the positioning terminal 10 and the display terminal 20, and receiving the location identifying information IL and/or the destination designating information IA from the other one.

The information providing system 1000 of this exemplary embodiment outputs the location-related information CT that is the content corresponding to the location identifying information IL output from the positioning terminal 10 having the positioning function, to the display terminal 20 not having the positioning function or to the destination DS that can be accessed by that.

In the positioning terminal 10, a location calculation information obtaining unit 11 receives the location identifying information IL from a positioning infrastructure 30. As the positioning infrastructure 30, various kinds of positioning systems, such as a satellite positioning system using a positioning satellite such as a GPS satellite, a public network positioning system using radio waves of portable telephones, or an indoor positioning system to be used mainly indoors, can be used.

As the indoor positioning system, a wireless LAN positioning system using radio waves of a wireless LAN, an ultrasonic positioning system using ultrasonic waves, an infrared positioning system using infrared rays, or the like is used.

As an example of the infrared positioning system, there is a system that identifies a location by receiving location identifying information transmitted as an infrared signal from a transmitter installed indoors, and transmitting a location ID based on the location identifying information to a location management server from a positioning terminal via another wireless communication infrastructure.

The location identifying information IL used in this exemplary embodiment is transmitted and received as location information defined by east longitude and north latitude, or as location calculation information for identifying a location.

Examples of the location calculation information include: information that indicates the differences in reception time of radio waves from plural positioning satellites or plural base stations; a test signal for calculating the difference in reception time of radio waves from plural positioning satellites or plural base stations; and a unique ID number that indicates the transmitter that has emitted an infrared signal or a radio signal.

The location-related information CT that is the content related to a location can be used in various example cases, depending on the positioning error of the positioning infrastructure 30. In a case where a satellite positioning system is used as the positioning infrastructure 30, the positioning error is larger than in a case where an indoor positioning system is used. Therefore, the location-related information CT related to a neighborhood facility or shop outdoors is shown as an example.

In the case of an indoor positioning system having a high positioning accuracy, on the other hand, the system can achieve a positioning accuracy of one meter. Accordingly, in a case where the indoor positioning system is used as the positioning infrastructure 30, the following services can be provided merely as an example to users by providing the location-related information CT to the display terminal 20.

1) A location-dependent information distribution service to provide explanations of nearby artworks and goods through sound, text, still images, or moving images on the display terminal 20 at an art museum, a shop, or the like.

2) A floor information distribution service or a navigation service to provide facilities information about respective floors to the display terminal 20 at an art museum, a shop, an office, or the like.

3) A business support service to automatically activate an appropriate application program or work screen corresponding to the location of an employee at a factory, a warehouse, a shop, or the like among application programs and work screens installed in the display terminal 20 owned by the employee.

4) A data sort service to rearrange a list of data such as telephone number data stored in the display terminal 20 or company-wide telephone number data stored in an in-house database, in accordance with the order of persons, departments, and objects existing in the vicinity of the display terminal 20.

Next, the information providing server 100 and the information providing system 1000 of this exemplary embodiment are described in greater detail. The location identifying information IL received by the positioning terminal 10 from the positioning infrastructure 30 is the data for identifying the location of the positioning terminal 10 related to the location-related information CT wanted by the user of the display terminal 20.

Therefore, the user owns both the positioning terminal 10 and the display terminal 20. The location identifying information IL may be transmitted from the positioning terminal 10 to the information providing server 100, or may be transmitted from the positioning terminal 10 to the information providing server 100 via the display terminal 20.

In the information providing system 1000 of this exemplary embodiment, the positioning terminal 10 transmits the location identifying information IL to the information providing server 100. The display terminal 20 receives positioning terminal identifying information IDP from the positioning terminal 10, and transmits link information LK to the information providing server 100.

Therefore, as represented in FIG. 1, the positioning terminal 10 includes a location calculation information transmitting unit 15 that transmits the location identifying information IL received at the location calculation information obtaining unit 11. The location calculation information transmitting unit 15 is connected to the information providing server 100 via a network 40.

The display terminal 20 is wirelessly connected to the network 40 via a content communicating unit 26, and receives the location-related information CT generated in the information providing server 100.

As the network 40, a local area network (Local Area Network: LAN), the Internet, NGN (Next Generation Network) as the next-generation Internet, or the like is used.

First identification information (the positioning terminal identifying information IDP) for identifying the positioning terminal 10 is assigned to the positioning terminal 10. Second identification information (display terminal identifying information IDD) for identifying the display terminal 20 is assigned to the display terminal 20.

In the information providing system 1000 of this exemplary embodiment, the receiving unit 110 of the information providing server 100 receives the link information LK containing the positioning terminal identifying information IDP and the display terminal identifying information IDD associated with each other, from the positioning terminal 10 or the display terminal 20.

The information generating unit 120 generates the location-related information CT related to the location L of the positioning terminal 10 identified by the received positioning terminal identifying information IDP and location identifying information IL.

The positioning terminal 10 or the display terminal 20 of this exemplary embodiment receives the display terminal identifying information IDD or the positioning terminal identifying information IDP assigned to the portable terminal on the other end.

The positioning terminal 10 or the display terminal 20 generates the link information L by associating the received display terminal identifying information IDD or positioning terminal identifying information IDP with the positioning terminal identifying information IDP or the display terminal identifying information IDD assigned to the terminal itself. The positioning terminal 10 or the display terminal 20 further transmits the generated link information LK to the information providing server 100.

That is, in the information providing server 100 of this exemplary embodiment, the receiving unit 110 receives the link information LK containing the positioning terminal identifying information IDP and the display terminal identifying information IDD associated with each other, from the positioning terminal 10 or the display terminal 20. The positioning terminal identifying information IDP for identifying the positioning terminal 10 is assigned to the positioning terminal 10, and the display terminal identifying information IDD for identifying the display terminal 20 is assigned to the display terminal 20.

The information generating unit 120 generates the location-related information CT related to the location L of the positioning terminal 10 identified by the received positioning terminal identifying information IDP and location identifying information IL.

As the positioning terminal identifying information IDP for identifying the positioning terminal 10, a unique identification number such as the manufacturer's serial number assigned to the positioning terminal 10 can be used. As the display terminal identifying information IDD for identifying the display terminal 20, an IP (Internet Protocol) address, a mail address, or a telephone number assigned to the display terminal 20, as well as a unique identification number such as the manufacturer's serial number can be used.

The destination designating information IA of the location-related information CT is data that designates the display terminal 20 or other hardware accessible by the display terminal 20 as the destination DS.

Various kinds of data can be used as the destination designating information IA. In a case where the information providing system 1000 is of a so-called pull-type, a web address for content distribution (a server address SA) assigned to the user, or the positioning terminal identifying information IDP or the display terminal identifying information IDD associated with the server address SA can be used as the destination designating information IA.

In a case where the information providing system 1000 is of a so-called push-type, an IP address, a mail address, or a telephone number assigned to the display terminal 20 can be used as the destination designating information IA.

The information providing system 1000 of this exemplary embodiment is of a pull type as will be described later in detail. The content communicating unit 131 of the information providing server 100 is a storage unit that stores the location-related information CT, and has a server address SA assigned thereto.

The user then designates the content communicating unit 131 of the information providing server 100 as the destination DS of the location-related information CT with the destination designating information IA. More specifically, the information providing server 100 stores the positioning terminal identifying information IDP of the positioning terminal 10 and the server address SA assigned to the positioning terminal 10 associated with each other.

The display terminal 20 then transmits the positioning terminal identifying information IDP as the destination designating information IA to the information providing server 100, so that the information providing server 100 stores the location-related information CT in the server address SA, namely in the content communicating unit 131.

Meanwhile, the user activates an application such as a browser on the display terminal 20, and accesses the location-related information CT stored in the server address SA so as to output the location-related information CT to the display terminal 20.

(Positioning Terminal)

As represented in FIG. 1, the positioning terminal 10 of this exemplary embodiment is a portable terminal that includes a data holding unit 12, a control unit 13, a link information communicating unit 14, and the location calculation information transmitting unit 15, as well as the location calculation information obtaining unit 11 that receives the location identifying information IL from the positioning infrastructure 30.

The data holding unit 12 of this exemplary embodiment stores the positioning terminal identifying information IDP and the web address (the server address SA) of the content communicating unit 131 of the information providing server 100. The data holding unit 12 may also store the location identifying information IL received by the location calculation information obtaining unit 11 from the positioning infrastructure 30.

The control unit 13 is a processing device that controls information processing in the positioning terminal 10. The link information communicating unit 14 of this exemplary embodiment is a communication interface that transmits the positioning terminal identifying information IDP and the server address SA to the display terminal 20.

The location calculation information transmitting unit 15 of this exemplary embodiment is a communication interface that is connected to the network 40 and transmits the location identifying information IL received from the positioning infrastructure 30 to a location calculation information receiving unit 111 of the information providing server 100.

(Display Terminal)

The display terminal 20 of this exemplary embodiment is a portable terminal that obtains the server address SA and the positioning terminal identifying information IDP from the positioning terminal 10 and generates the link information LK, and communicates with the information providing server 100.

The display terminal 20 is preferably capable of outputting at least any one of text data, image data, and audio data, and may be a portable telephone device, for example.

The display terminal 20 includes not only a content communicating unit 26 that receives the location-related information CT and a display output unit 21 that displays and outputs the location-related information CT, but also a data holding unit 22, a control unit 23, and a link information communicating unit 24.

The data holding unit 22 of this exemplary embodiment stores the display terminal identifying information IDD. The data holding unit 22 may also store the positioning terminal identifying information IDP and the server address SA received from the positioning terminal 10. The data holding unit 22 may also store the location-related information CT received from the information providing server 100.

The control unit 23 is a processing device that controls information processing in the display terminal 20. The link information communicating unit 24 of this exemplary embodiment is a communication interface that receives the positioning terminal identifying information IDP and the server address SA from the link information communicating unit 14 of the positioning terminal 10.

The display terminal 20 receives the positioning terminal identifying information IDP from the positioning terminal 10 through wireless communication. The wireless communication may be IrDA (Infrared Data Association) through infrared communication, RFID (Radio Frequency Identification) through radio waves, or Bluetooth (a registered trademark) using the 2.4-GHz frequency band, for example.

(Information Providing Server)

The information providing server 100 of this exemplary embodiment includes not only a transmitting-and-receiving unit 114 including the receiving unit 110 and the transmitting unit 112, and the information generating unit 120, but also a control unit 103 and a location managing unit 130 that is a data base storing the location L of the positioning terminal 10.

More specifically, the transmitting-and-receiving unit 114 includes: the location calculation information receiving unit 111 that receives the link information LK and the location identifying information IL; and the content communicating unit 131 that stores the location-related information CT generated by the information generating unit 120. It should be noted that a plurality of location-related information CT may be generated and stored.

The information generating unit 120 includes: a content holding unit 121 that stores and holds various kinds of content information; and a location calculating unit 122 that calculates the location L of the positioning terminal 10, based on the location identifying information IL received by the location calculation information receiving unit 111.

The location calculating unit 122 is an arithmetic device that, calculates the location L of the positioning terminal 10 by applying a known arithmetic processing to the location identifying information IL received by the location calculation information receiving unit 111.

The data format of the location L is not particularly limited. For example, latitude-and-longitude data defined by latitude and longitude, or relative coordinates, an area number, an area name, or the like in a building corresponding to a transmitter that has transmitted the location identifying information IL may be used as the location L.

FIG. 2 is a diagram representing an example of a content table stored in the content holding unit 121. The content holding unit 121 stores content data to be provided to the display terminal 20 in accordance with the location L of the positioning terminal 10. The content data is stored in the form of text data, still image data, moving image data, or audio data.

In this exemplary embodiment, where the location L of the positioning terminal 10 calculated by the location calculating unit 122 is "000001" or "000002," the corresponding set of data is selected from sets of HTML (Hyper Text Markup Language) data that is text data. The selected data is transmitted from the content communicating unit 131 to the content communicating unit 26 of the display terminal 20.

Likewise, in a case where the location L is "000003," JPG (Joint Photographic Experts Group) data that is still image data and WAV (WAVE format) data that is audio data are selected, and are transmitted from the content communicating unit 131.

In a case where the location L is "000004," AVI (Audio Video Interleaving) data that is moving image data is selected, and is transmitted from the content communicating unit 131.

In the present invention, generating the location-related information CT in the information generating unit 120 includes extracting the content data held in the content holding unit 121 as it is, and creating new data by processing the content data.

The location L stored in the information providing server 100 is various kinds of location information indicating the location of the positioning terminal 10 indoors, as well as the latitude-and-longitude information about the positioning terminal 10. Hereinafter, such location information will be referred to as the location L, unless otherwise specified.

FIG. 3 is a diagram representing an example of a location table about the locations L of positioning terminals 10 stored in the location managing unit 130. With respect to the positioning terminals 10, the location managing unit 130 stores the positioning terminal identifying information IDP contained in the link information LK, the respective locations L, and location calculation times TP at which the locations L of the positioning terminals 10 are measured, associated with one another.

The location calculation times TP may be the times when the respective positioning terminals 10 receive the location identifying information IL from the positioning infrastructure 30, or the times when the location calculating unit 122 calculates the locations of the positioning terminals 10, based on the location identifying information IL.

The time when each positioning terminal 10 receives the location identifying information IL from the positioning infrastructure 30 is stored in the header of the location identifying information IL.

(Information Providing Method and Computer Program)

In the following, the method of providing the location-related information CT that is the information related to the location L to the display terminal 20 in the information providing system 1000 is described in detail. FIGS. 4(A) through 4(C) are flowcharts of the information providing method according to this exemplary embodiment (hereinafter also referred to as this method). Referring to those flowcharts, an outline of this method is first described.

According to this method, receiving step S20 can be carried out only once or can be repeated two or more times. Location calculating step S32 may be carried out every time the receiving step S20 is carried out once, or the location calculating step S32 may be carried out once every time the receiving step S20 is carried out two or more times. Therefore, in the flowcharts of FIGS. 4(A) through 4(C), an independent process of each flowchart, or a repetition or a skip of each step may be included as needed.

This method mainly includes three independent operations. A first one is a linking operation to link the positioning terminal 10 with the display terminal 20 (see FIG. 4(A)). A second one is a location identifying operation to receive the location identifying information IL and identify the location L of the positioning terminal 10 (see FIG. 4(B)). A third one is a content providing operation to generate the location-related information CT in accordance with the location L of the positioning terminal 10, and transmit the location-related information CT to the destination DS (see FIG. 4(C)).

This method includes at least the receiving step S20, the location calculating step S32, content generating step S34, transmitting step S40, and outputting step S50.

In the receiving step S20 of FIG. 4(B), the destination designating information IA for designating the destination DS of the location-related information CT and the location identifying information IL are received from the positioning terminal 10 having the positioning function and outputting the location identifying information IL for identifying the location L, or the display terminal 20 that does not have a positioning function but receives and outputs the location-related information CT.

In the location calculating step S32 of FIG. 4(B), the location L of the positioning terminal 10 is identified by the received location identifying information IL.

In the content generating step S34 of FIG. 4(C), the location-related information CT related to the identified location L of the positioning terminal 10 is generated.

In the transmitting step S40 of FIG. 4(C), the generated location-related information CT is transmitted to the destination DS, based on the received destination designating information IA.

In the outputting step S50 of FIG. 4(C), the display terminal 20 receives and outputs the transmitted location-related information CT.

As represented in FIG. 4(A), this method further includes the linking step S10 of generating the link information LK containing the positioning terminal identifying information IDP that is assigned to the positioning terminal 10 and identifies the positioning terminal 10, and the display terminal identifying information IDD that is assigned to the display terminal 20 and identifies the display terminal 20, with the positioning terminal identifying information IDP and the display terminal identifying information IDD being associated with each other.

FIG. 4(B) is now described. FIG. 4(B) is a flowchart of the operation to identify the location L from the location identifying information IL received by the positioning terminal 10. In the receiving step S20, the link information LK is received from the positioning terminal 10 or the display terminal 20. The location calculating step S32 is then carried out to calculate the location L of the positioning terminal 10, based on the location identifying information IL received in the receiving step S20.

In FIG. 4(C), the location-related information CT related to the calculated location L of the positioning terminal 10 is generated (the content generating step S34). After the generated location-related information CT is transmitted to the destination DS based on the received destination designating information IA (the transmitting step S40), the display terminal 20 receives and outputs the transmitted location-related information CT (the outputting step S50).

The computer program according to this exemplary embodiment (hereinafter also referred to as this program) is a computer program for the information providing server 100 that provides the location-related information CT that is the information related to the location L.

This program causes the information providing server 100 to perform: a receiving process to receive the destination designating information IA for designating the destination DS of the location-related information CT and the location identifying information IL from the positioning terminal 10 that has the positioning function and outputs the location identifying information IL for identifying the location L, or the display terminal 20 that does not have a positioning function and receives and outputs the location-related information CT; an information generating process to generate the location-related information CT related to the location L of the positioning terminal 10 identified by the received location identifying information IL; and a transmitting process to transmit the generated location-related information CT to the destination DS based on the received destination designating information IA.

According to this program, in the information providing server 100, the link information LK containing the positioning terminal identifying information IDP and the display terminal identifying information IDD associated with each other is received from the positioning terminal 10 or the display terminal 20. The positioning terminal identifying information IDP for identifying the positioning terminal 10 is assigned to the positioning terminal 10 beforehand, and the display terminal identifying information IDD for identifying the display terminal 20 is assigned to the display terminal 20 beforehand.

According to this program, in the information generating process, the location-related information CT related to the location L of the positioning terminal 10 identified by the received positioning terminal identifying information IDP and location identifying information IL is generated.

Figure 5:
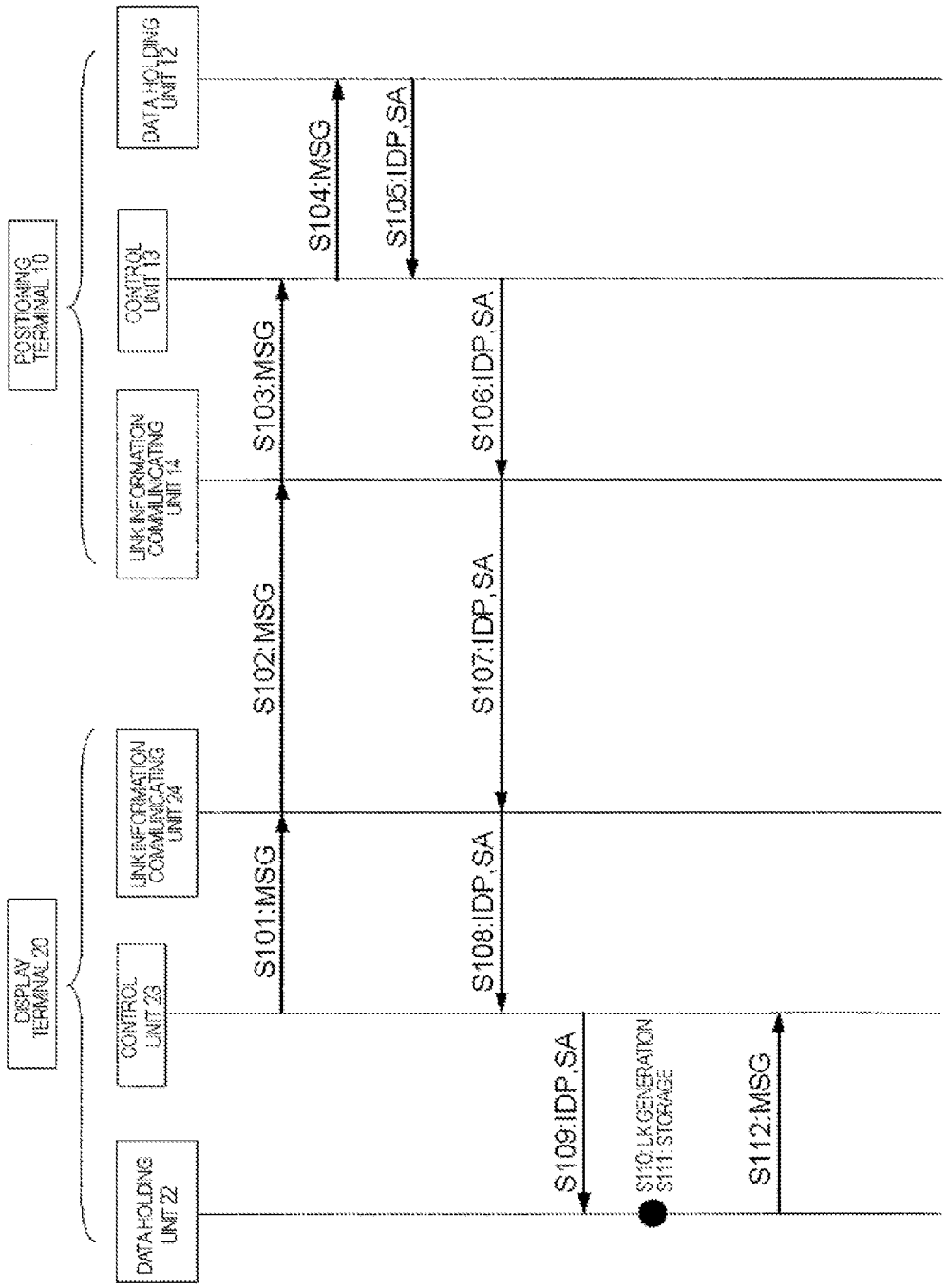
FIG. 5 is a sequence diagram representing a linking step according to the first exemplary embodiment.
Figure 6:
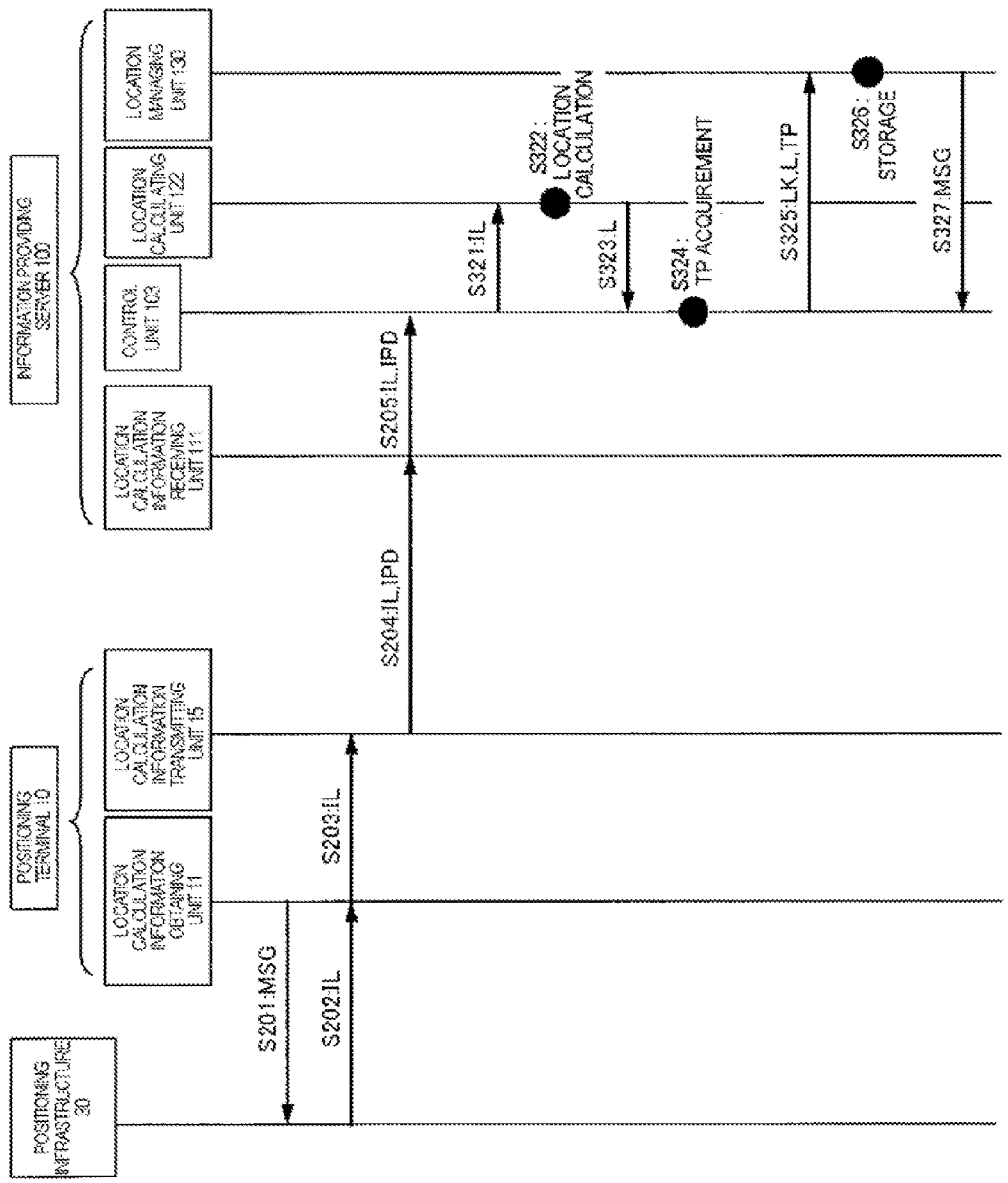
FIG. 6 is a sequence diagram representing a receiving step and a location calculating step according to the first exemplary embodiment.
Figure 7:
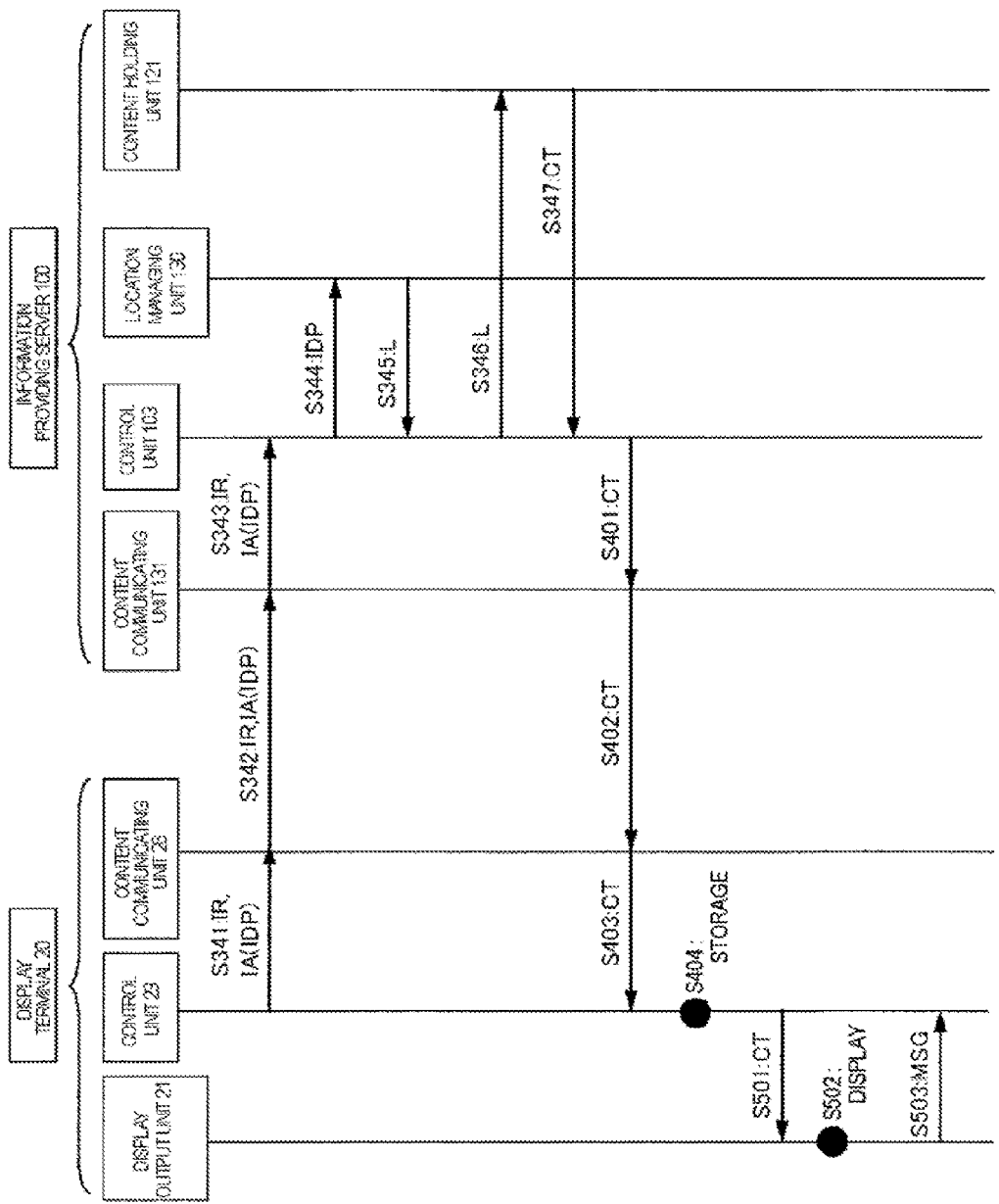
FIG. 7 is a sequence diagram representing a content generating step, a transmitting step, and an outputting step according to the first exemplary embodiment.

FIGS. 5 through 7 are sequence diagrams illustrating this method. Referring to those drawings, this method is now described in detail. FIG. 5 is a sequence diagram representing the linking step S10 of FIG. 4(A). As represented in the drawing, the linking step S10 includes steps S101 through S112.

In the linking step S10, the positioning terminal 10 or the display terminal 20 receives the display terminal identifying information IDD or the positioning terminal identifying information IDP assigned to the portable terminal on the other end, and generates the link information LK by associating the received display terminal identifying information IDD or positioning terminal identifying information IDP with the positioning terminal identifying information IDP or the display terminal identifying information IDD assigned to the terminal itself.

This method is described by way of an example case where the display terminal 20 receives the positioning terminal identifying information IDP from the positioning terminal 10, and generates the link information LK by associating the positioning terminal identifying information IDP with the display terminal identifying information IDD.

The control unit 23 of the display terminal 20 transmits a message MSG requesting the positioning terminal identifying information IDP (a positioning terminal identifying information acquirement requesting notification) to the control unit 13 of the positioning terminal 10.

The message MSG is sent from the control unit 23 to the link information communicating unit 24 (step S101), and is then transmitted to the link information communicating unit 14 of the positioning terminal 10 by infrared communication (IrDA) (step S102).

The message MSG is sent from the link information communicating unit 14 to the control unit 13 (step S103), and is sent as an identification information acquirement requesting notification to the data holding unit 12 (step S104). In response to the request, the data holding unit 12 returns the positioning terminal identifying information IDP and the server address SA of the information providing server 100 (step S105).

Upon receipt of the positioning terminal identifying information IDP and the server address SA, the control unit 13 transmits the positioning terminal identifying information IDP and the server address SA to the control unit 23 via the link information communicating unit 14 and the link information communicating unit 24 (steps S106 to S108). The control unit 23 transmits the positioning terminal identifying information IDP and the server address SA to the data holding unit 22 (step S109).

The control unit 23 then generates the link information LK containing the display terminal identifying information IDD and the positioning terminal identifying information IDP stored in the data holding unit 22 (step S110), and stores the link information LK as well as the server address SA into the data holding unit 22 (step S111). The data holding unit 22 returns a message MSG indicating that generation and storage of the link information LK have been completed, to the control unit 23.

FIG. 6 is a sequence diagram representing the receiving step S20 and the location calculating step S32 of FIG. 4(B). According to this method, the receiving step S20 includes steps S201 through S205. The location calculating step S32 includes steps S321 through S327.

According to this method, the location identifying information IL about the positioning terminal 10 is transmitted from the positioning terminal 10 to the information providing server 100. The positioning terminal 10 acquires the location identifying information IL indicating the location L of the positioning terminal 10 (step S202).

The received location identifying information IL is transmitted from the control unit 13 to the location calculation information transmitting unit 15 (step S203). The control unit 103 transmits the location identifying information IL and the positioning terminal identifying information IDP stored in the data holding unit 12 to the location calculation information receiving unit 111 of the receiving unit 110 of the information providing server 100 (step S204).

In this exemplary embodiment, the positioning terminal identifying information IDP is the information to be transmitted as the destination designating information IA from the positioning terminal 10 to the information providing server 100 in the later described content generating step S34. The location identifying information IL and the positioning terminal identifying information IDP are transmitted from the location calculation information receiving unit 111 to the control unit 103 (step S205).

Next, the location calculating step S32 is described. The control unit 103 of the information providing server 100 transmits the location identifying information IL received in step S205 to the location calculating unit 122 (step S321), and the location calculating unit 122 (see FIG. 1) calculates the location L of the positioning terminal 10 (step S322).

The calculated location L is temporarily transferred to the control unit 103 (step S323). The control unit 103 then obtains the location calculation time TP with respect to the location L of the positioning terminal 10 (step S324).

According to this method, the location calculation time TP is obtained by the control unit 103 reading the location calculation time TP stored in the header of the location identifying information IL. The control unit 103 transmits the obtained location calculation time TP, the link information LK and the location L to the location managing unit 130 (step S325).

After storing the data (step S326), the location managing unit 130 returns a message MSG indicating that the storing process has been completed, to the control unit 103 (step S327).

Through the above operations, the location L of the positioning terminal 10 and the display terminal identifying information IDD that is the mail address of the destination of the location-related information CT are associated with each other by using the positioning terminal identifying information IDP as the key and are stored into the information providing server 100.

To obtain the location identifying information IL indicating the location L of the positioning terminal 10 (step S202), a message MSG requesting the location identifying information IL may be transmitted from the location calculation information obtaining unit 11 to the positioning infrastructure 30 (step S201).

FIG. 7 is a sequence diagram representing the content generating step S34, the transmitting step S40, and the outputting step S50 of this method represented in FIG. 4(C). The content generating step S34 includes steps S341 through S347.

The transmitting step S40 includes steps S401 through S404. The outputting step S50 includes steps S501 through S503. According to this method, request information IR requesting provision of the location-related information CT and the destination designating information IA are transmitted from the display terminal 20 to the information providing server 100.

The information providing server 100 carries out the location calculating step S32, the content generating step S34, and the transmitting step S40, based on the request information IR.

Accordingly, the method, by which the display terminal 20 transmits the request information IR to the information providing server 100 and receives the location-related information CT, is a so-called pull-type content providing method led by the display terminal 20.

In the present invention, the request information IR may not be transmitted from the positioning terminal 10 or the display terminal 20 to the information providing server 100, and the location-related information CT may be obtained by a so-called push-type method, as will be later described in a sixth exemplary embodiment.

In the content generating step S34 of this method, the control unit 23 of the display terminal 20 transmits the request information IR and the positioning terminal identifying information IDP as the destination designating information IA to the control unit 103 through the display terminal 20 and the content communicating units 26 and 131 of the information providing server 100 (steps S341 to S343). It should be noted that the positioning terminal identifying information IDP is stored in the data holding unit 22 of the display terminal 20 (see step S111 of FIG. 5).

Upon receipt of the request information IR and the destination designating information IA (the positioning terminal identifying information IDP), the control unit 103 notifies the location managing unit 130 of the positioning terminal identifying information IDP (step S344), and obtains the location L corresponding to the positioning terminal identifying information IDP from the location table represented in FIG. 3 (step S345).

The control unit 103 then notifies the content holding unit 121 of the location L (step S346), and generates and obtains the location-related information CT corresponding to the location L, based on the content table represented in FIG. 2 (step S347).

According to this method, still image data is generated as an example of the location-related information CT. Further, in the transmitting step S40, the control unit 103 stores the generated location-related information CT into the content communicating unit 131 (step S401).

Meanwhile, in the display terminal 20, the server address SA that is the web address of the content communicating unit 131 is input to the browser, so that the location-related information CT stored in the content communicating unit 131 is transmitted to the content communicating unit 26 through the network 40 (see FIG. 1) (step S402).

The control unit 23 of the display terminal 20 obtains the location-related information CT received by the content communicating unit 26 (step S403), and stores the location-related information CT into the data holding unit 22 (step S404).

The outputting step S50 is then carried out in the display terminal 20. Specifically, the control unit 23 sends still image data that is the stored location-related information CT to the display output unit 21 (step S501), and the display output unit 21 displays and outputs the still image data (step S502).

The display output unit 21 returns a message MSG indicating that the location-related information CT has been displayed and output without an error, to the control unit 23. Through the above operation, the user of the display terminal 20 can obtain the location-related information CT that is the content corresponding to the location L of the positioning terminal 10.

In a case where the user moves, and the location identifying information IL of the positioning terminal 10 is updated, the positioning terminal 10 automatically transmits the new location identifying information IL to the information providing server 100 through the location calculation information transmitting unit 15, without an operation by the user. In this manner, the location calculating step S32 (see FIG. 6) is carried out in the information providing server 100.

The user then operates the display terminal 20 in predetermined timing to carry out the content generating step S34 (see FIG. 7), so that the location-related information CT corresponding to the new location L is saved in the content communicating unit 131 with overwrite mode. Accordingly, in the display terminal 20, the display of the browser, for example, is updated, so as to display and output the new location-related information CT.

It should be noted that the flowcharts of FIGS. 4(A) through 4(C) are not limited to those procedures, as long as the results and effects to be achieved are the same as above. For example, the content generating step S34 of FIG. 4(C) may be carried out after the location calculating step S32 of FIG. 4(B).

Figure 8:
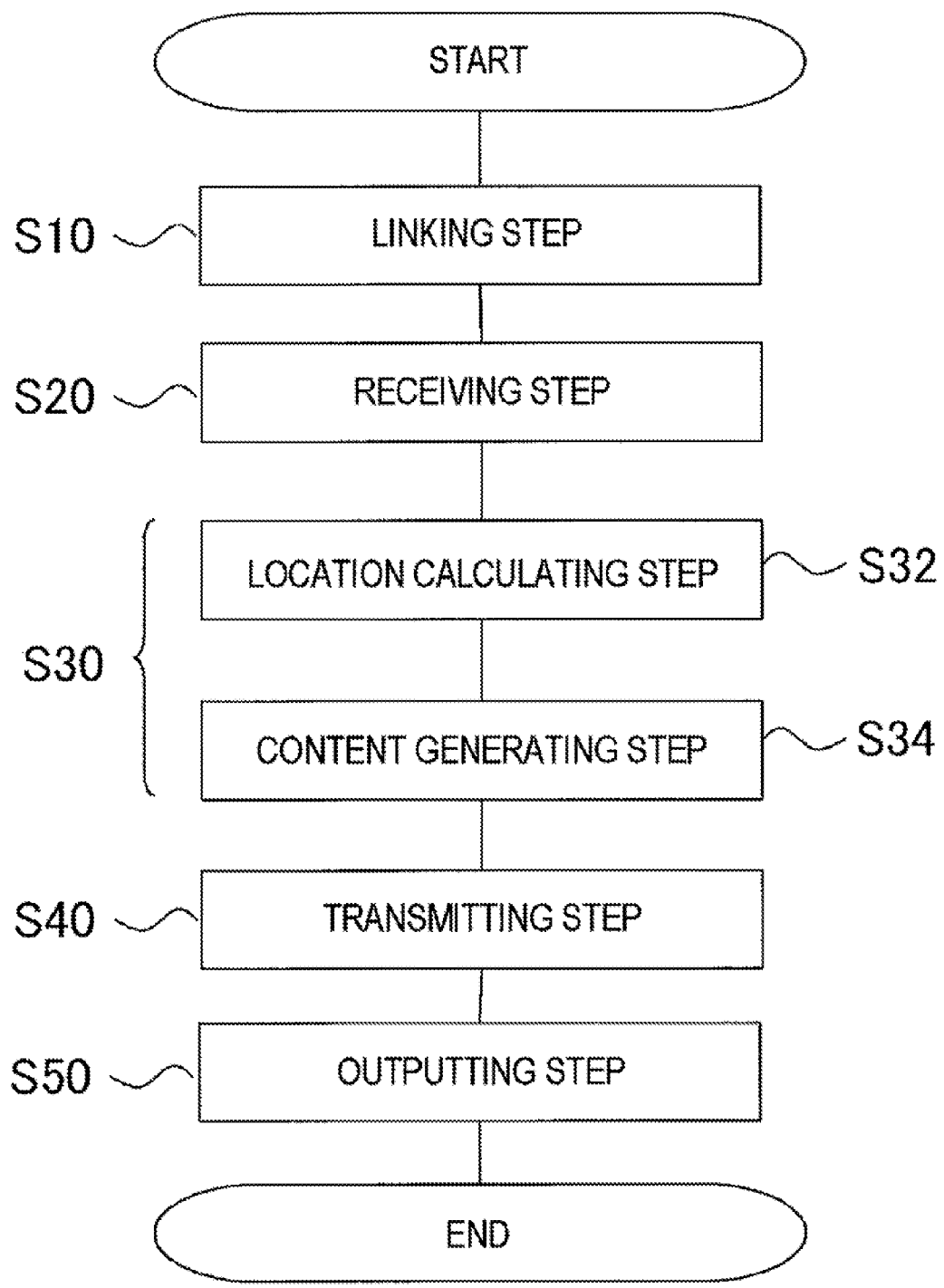
FIG. 8 is a flowchart representing a modification of the information providing method according to the first exemplary embodiment.

Also, this method may be implemented based on a single flowchart, for example, as represented in FIG. 8. In FIG. 8, the receiving step S20 can be carried out only once or can be repeated two or more times.

The location calculating step S32 may be carried out every time the receiving step S20 is carried out once, or the location calculating step S32 may be carried out once every time the receiving step S20 is carried out two or more times.

Therefore, in the flowchart of FIG. 8, a repetition or a skip of each step may be included as needed. In this case, the location calculating step S32 and the content generating step S34 are referred to collectively as an information generating step S30.

That is, the information generating step S30 of this method is the step of generating the location-related information CT related to the location L of the positioning terminal 10 identified by the location identifying information IL received from the display terminal 20.

When the receiving unit 110 receives the request information IR from the positioning terminal 10 or the display terminal 20 in the receiving step S20, the information providing server 100 carries out the information generating step S30 and the transmitting step S40, based on the request information IR.

The operation and effect of the information providing server 100, the information providing system 1000, and the information providing method of this exemplary embodiment are now described. In this exemplary embodiment, the location identifying information IL output from the positioning terminal 10 having a positioning function, and the destination designating information IA for designating the destination DS of the location-related information CT are transmitted to the information providing server 100.

With this arrangement, the user can receive the location-related information CT through the display terminal 20 not having a positioning function, without advance registration of a mapping table associating the positioning terminal 10 with the display terminal 20 in the information providing server 100.

Also, using the positioning infrastructure 30 having an appropriate positioning accuracy for the location of a destination of movement, and the corresponding positioning terminal 10, the user can receive the location-related information through the second portable terminal not having a positioning function.

Accordingly, in a case where the positioning terminal 10 is rented to the user, for example, the location-related information CT can be readily received by the display terminal 20 owned by the user.

In this exemplary embodiment, the positioning terminal 10 transmits the location identifying information IL to the information providing server 100, and the display terminal 20 receives the positioning terminal identifying information IDP from the positioning terminal 10, and transmits the link information LK to the information providing server 100.

With this structure, the receiving step S20 represented in FIG. 6 can be automatically carried out on from the positioning terminal 10 to the information providing server 100 in accordance with movement of the user. Also, the display terminal 20 represented in FIG. 7 can carry out the content generating step S 34 at a user-desired timing.

Also, in this exemplary embodiment, the request information IR requesting provision of the location-related information CT is transmitted from the positioning terminal 10 or the display terminal 20 to the information providing server 100. With this arrangement, a pull-type information providing method is realized.

It should be noted that various modifications may be made to this exemplary embodiment, without departing from the scope thereof. For example, in the above exemplary embodiment, the location identifying information IL about the positioning terminal 10 is transmitted from the positioning terminal 10 to the information providing server 100. However, the present invention is not limited to that, and the display terminal 20 may receive the location identifying information IL from the positioning terminal 10, and transmits the location identifying information IL to the information providing server 100.

In such a case, the display terminal 20 may include a location calculation information receiving unit 25 that is a communication interface for obtaining the location identifying information IL, which is transmitted from the positioning infrastructure 30 to the positioning terminal 10, from the positioning terminal 10, as represented in FIG. 1.

The location calculation information receiving unit 25 receives the location identifying information IL from the location calculation information transmitting unit 15, using IrDA, RFID, Bluetooth, a special-purpose connecting cable, or the like. The display terminal 20 then transmits the location identifying information IL to the information providing server 100 via the content communicating unit 26.

As the display terminal 20 receives the location identifying information IL from the positioning terminal 10 and transmits the location identifying information IL to the information providing server 100, the positioning terminal 10 does not need to have the function of communicating with the network 40, as long as the positioning terminal 10 has the function of interfacing with the positioning infrastructure 30 and the display terminal 20.

Also, the destination designating information IA may be transmitted from the display terminal 20 to the information providing server 100 as in the above described exemplary embodiment, or may be transmitted from the positioning terminal 10 to the information providing server 100.

As the destination designating information IA, an IP address or a mail address assigned to the positioning terminal 10 may be used. That is, in the information providing system 1000 of the present invention, the location-related information CT transmitted from the transmitting unit 112 of the information providing server 100 may be temporarily received at the positioning terminal 10, and may be then transferred from the positioning terminal 10 to the display terminal 20 via a wireless or wired line.

Second Exemplary Embodiment

Figure 9:
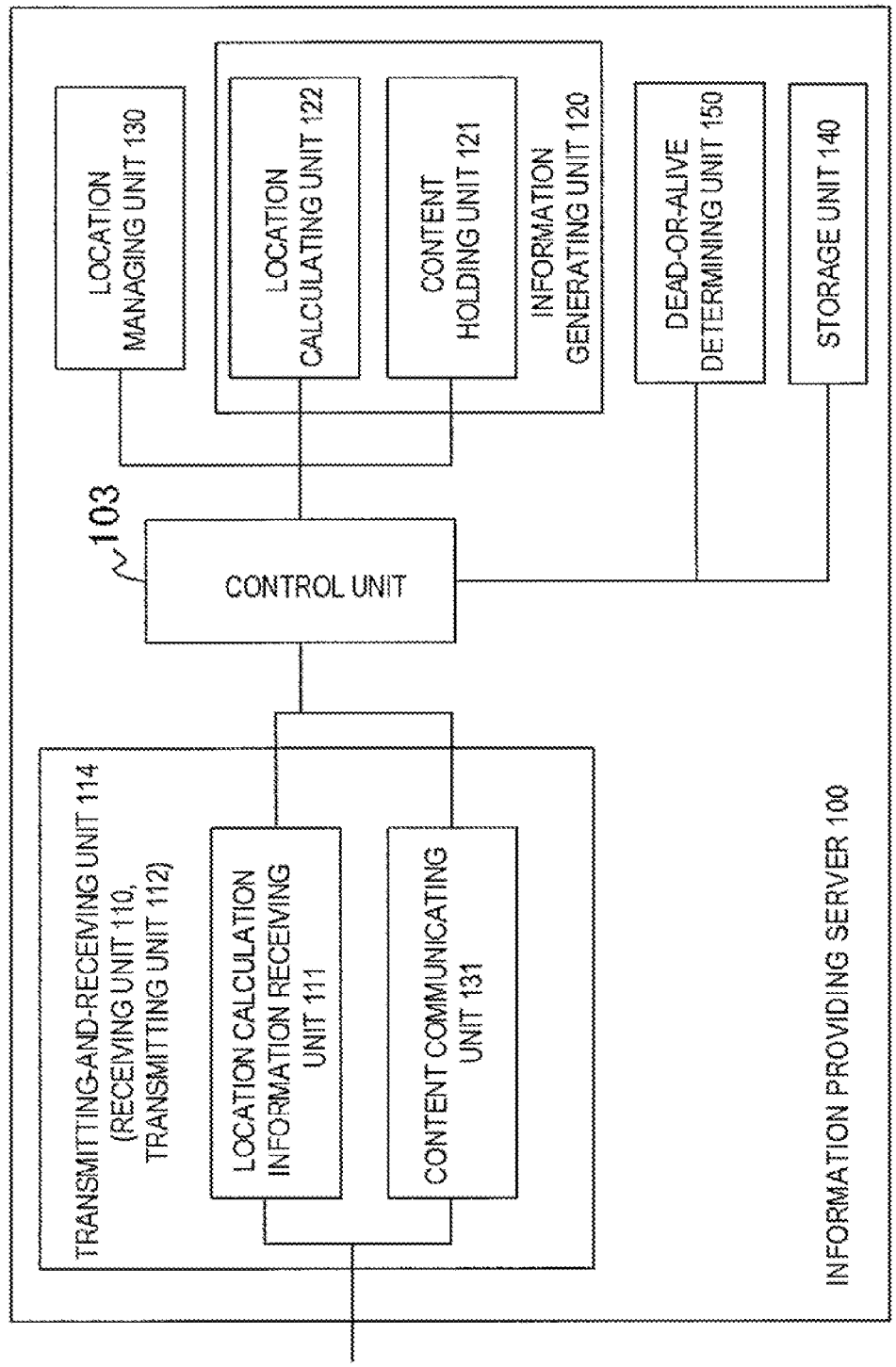
FIG. 9 is a functional block diagram of the information providing server according to a second exemplary embodiment.

The information providing system 1000 of this exemplary embodiment cancels the link between a positioning terminal 10 and a display terminal 20 associated with each other under predetermined conditions. FIG. 9 is a functional block diagram of the information providing server 100 of this exemplary embodiment.

The information providing server 100 of this exemplary embodiment differs from the first exemplary embodiment in that a storage unit 140 and a dead-or-alive determining unit 150 are connected to the control unit 103. In the information providing system 1000 of this exemplary embodiment, the information providing server 100 further includes the storage unit 140 that stores received link information LK associated with reception time TL of the link information LK.

When predetermined time comes, the information providing system 1000 deletes part of or all of the stored link information LK. FIG. 10 is a diagram representing an example of a link table stored in the storage unit 140.

In the link table, the reception time TL indicating the time when the control unit 103 receives the link information LK, and the time when the location L of the positioning terminal 10 is calculated by the location calculating unit 122 (access time TA) are associated with each other and stored, as well as the positioning terminal identifying information IDP and the display terminal identifying information IDD.

The information providing server 100 of this exemplary embodiment determines whether the association between the positioning terminal 10 and the display terminal 20 is to be left (alive) or to be cancelled (dead) by updating the link table stored in the storage unit 140.

Figure 11:
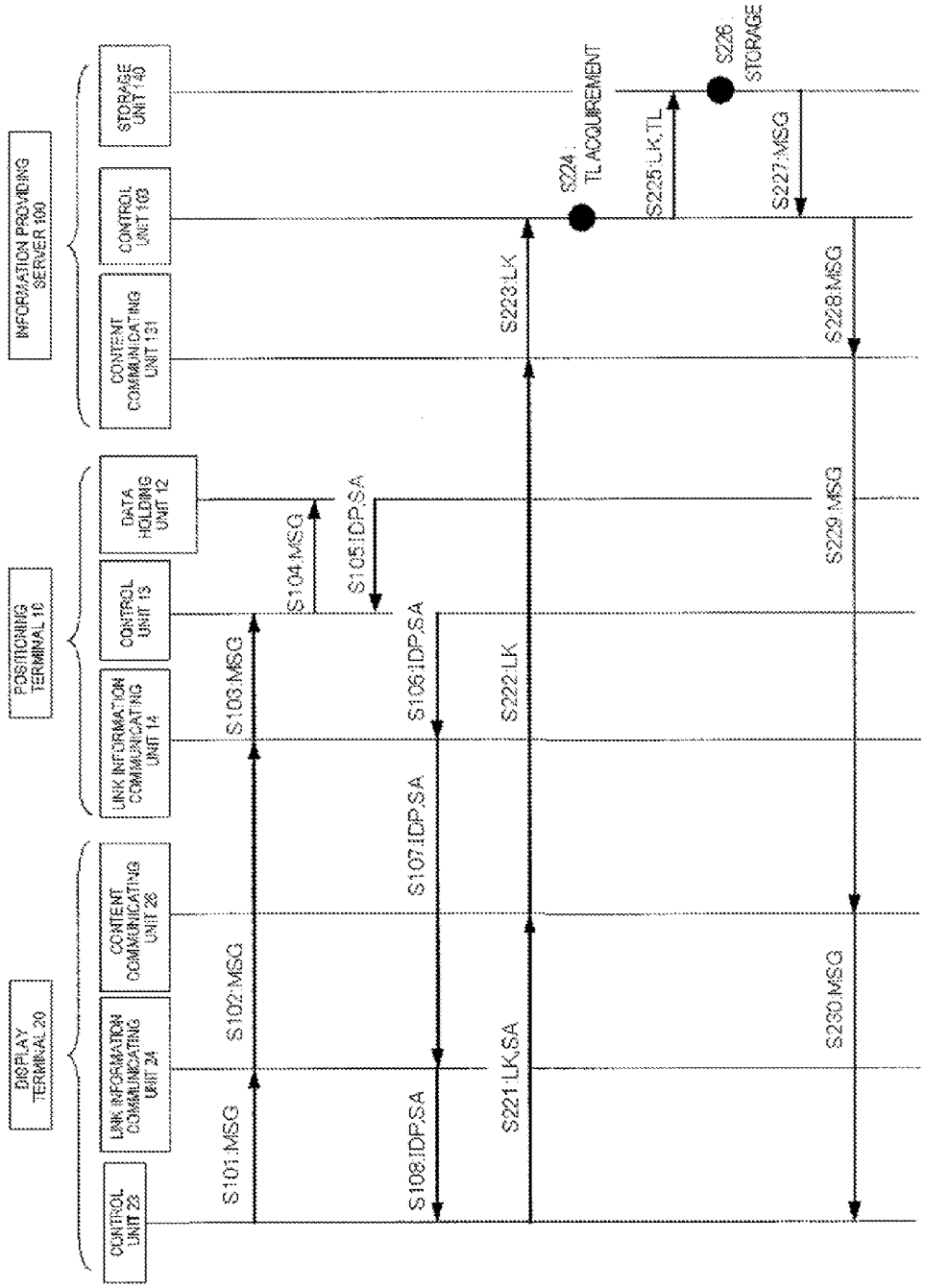
FIG. 11 is a sequence diagram representing a linking step and part of a receiving step according to the second exemplary embodiment.

The dead-or-alive determining unit 150 determines whether to update the link table by the information providing server 100. FIG. 11 is a sequence diagram representing the linking step S10 and part of the receiving step S20 in the information providing system 1000 of this exemplary embodiment.

The linking step S10 of this exemplary embodiment includes steps S101 to S108, and is the same as the linking step S10 of the first exemplary embodiment represented in FIG. 5. Therefore, overlapping description will be omitted.

The receiving step S20 of this exemplary embodiment includes steps S221 to S230. Based on a server address SA received from the positioning terminal 10, the control unit 23 of the display terminal 20 establishes communication between the content communicating unit 26 and the content communicating unit 131 of the information providing server 100.

The control unit 23 transmits the positioning terminal identifying information IDP and the display terminal identifying information IDD as the link information LK to the control unit 103 of the information providing server 100 (steps S221 through S223).

The control unit 103 obtains the reception time TL at which the link information LK is received (step S224). The reception time TL may be obtained from a PC executing this program, or may be obtained from a time server, for example. The control unit 103 then transmits the reception time TL together with the link information LK to the storage unit 140 (step S225), and stores the information into the storage unit 140 (step S226).

The storage unit 140 transmits a message MSG from the control unit 103 to the display terminal 20 through the content communicating unit 131 (steps S227, S228, and S229). The message MSG indicates that the link information LK and the reception time TL have been associated with each other and have been registered in the information providing server 100.

Figure 12:
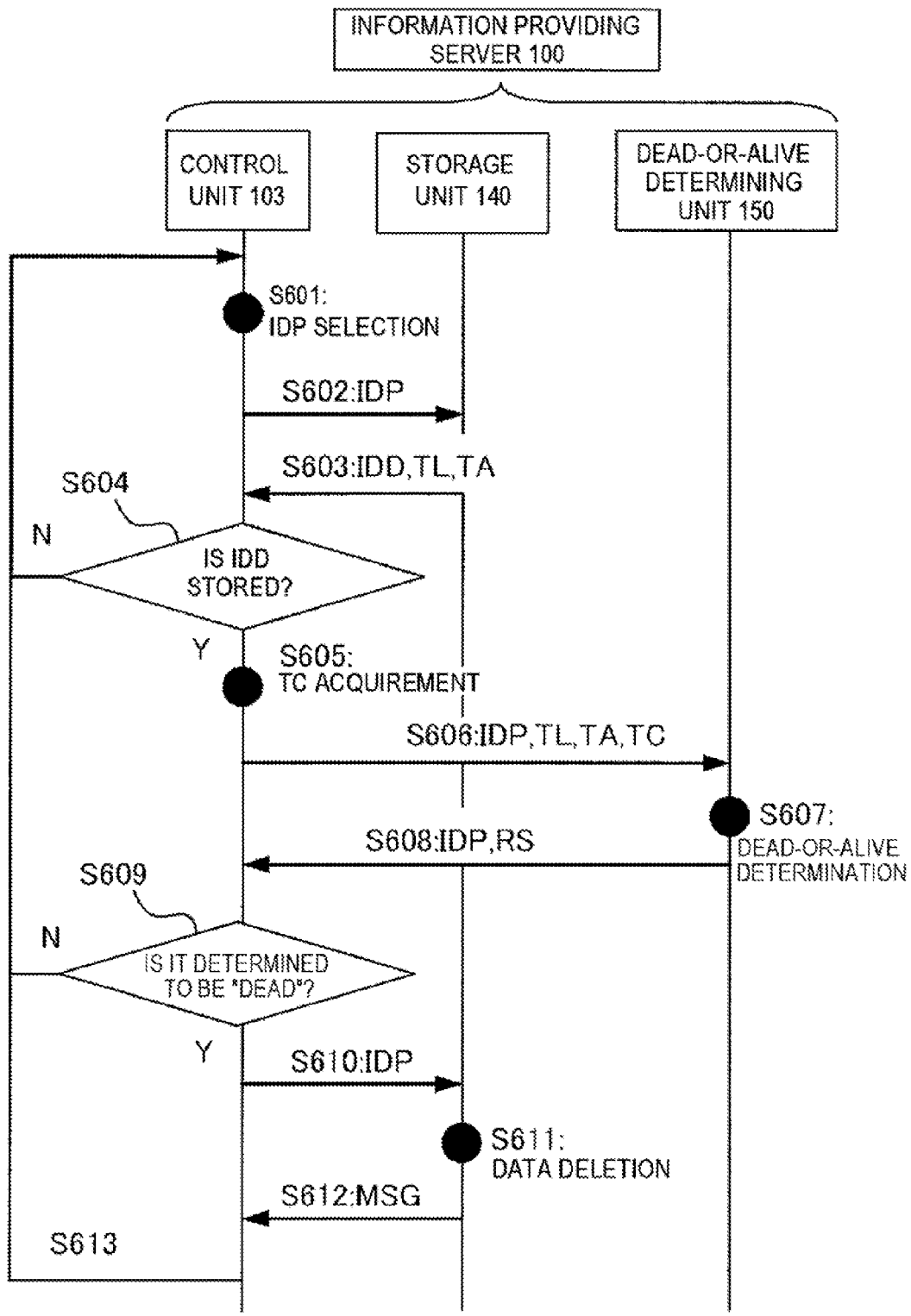
FIG. 12 is a sequence diagram representing a dead-or-alive determining step according to the second exemplary embodiment.

The message MSG is transmitted from the content communicating unit 26 to the control unit 23 (step S230). FIG. 12 is a sequence diagram representing the dead-or-alive determining step S60 to be carried out in the information providing system 1000 of this exemplary embodiment.

As represented in the drawing, the dead-or-alive determining step S60 includes steps S601 through S613. In this exemplary embodiment, the dead-or-alive determining step S60 is carried out in a flow that has a loop independent of the series of data processing operations represented in FIG. 4.

The control unit 103 selects desired positioning terminal identifying information IDP from the location table (see FIG. 3) stored in the location managing unit 130 (see FIG. 9) (step S601), and notifies the storage unit 140 of the positioning terminal identifying information IDP (step S602).

The storage unit 140 refers to the link table represented in FIG. 10 to read the display terminal identifying information IDD, the reception time TL, and the access time TA, which are associated with the positioning terminal identifying information IDP, and returns those to the control unit 103 (step S603).

The control unit 103 determines whether the display terminal identifying information IDD has been returned from the storage unit 140, that is, whether the display terminal identifying information IDD is stored in the link table (step S604). If the result of step S604 is positive (Y in S604), the control unit 103 obtains the current time TC (step S605).

The control unit 103 then transmits the positioning terminal identifying information IDP, the reception time TL, the access time TA, and the current time TC to the dead-or-alive determining unit 150 (step S606).

The dead-or-alive determining unit 150 refers to the link table represented in FIG. 10, and performs a dead-or-alive determining operation to determine whether the predetermined time has come to determine that the association between the subject positioning terminal identifying information IDP and the display terminal identifying information IDD is dead (step S607).

If the association between the positioning terminal identifying information IDP and the display terminal identifying information IDD stored in the storage unit 140, that is, the link information LK, is not updated over a long period of time, the information providing server 100 of this exemplary embodiment determines that the link information LK is dead, and deletes part of or all of the link information LK.

The above predetermined time used in the dead-or-alive determining operation can be determined from various points of view. In this exemplary embodiment, the above predetermined time is defined as the point of time at which a certain period of time has passed since the reception time TL.

In this exemplary embodiment, when twenty-four hours have passed since the reception time TL, the display terminal identifying information IDD in the link table is deleted. The current time TC is set at 13:00:00 on Oct. 2, 2008.

As illustrated in FIG. 10, as for the positioning terminal 10 having the positioning terminal identifying information IDP of 0001, twenty-four hours have not passed since the reception time TL till the current time TC. Therefore, the dead-or-alive determining unit 150 determines that the positioning terminal identifying information IDP of 0001 is "ALIVE."

As for the positioning terminal 10 having the positioning terminal identifying information IDP of 0002, on the other hand, twenty-four hours have passed since the reception time TL till the current time TC. Therefore, the dead-or-alive determining unit 150 determines that the positioning terminal identifying information IDP of 0002 is "DEAD" (step S607 of FIG. 12).

The dead-or-alive determining unit 150 then notifies the control unit 103 of the positioning terminal identifying information IDP and the dead-or-alive determination result RS (step S608). If the dead-or-alive determination result RS indicates "dead" (Y in step S609), the control unit 103 receiving the dead-or-alive determination result RS notifies the storage unit 140 of the positioning terminal identifying information IDP (step S610).

In the storage unit 140, the row of the corresponding positioning terminal 10 (or the positioning terminal identifying information IDP of 0002) is deleted from the link table (see FIG. 10) (step S611).

A message MSG indicating that such a data deletion has been carried out and the link table in the storage unit 140 has been updated is sent from the storage unit 140 to the control unit 103 (step S612).

When a predetermined period of time has passed, the dead-or-alive determining step S60 loops back, and step S601 is again carried out. If the positioning terminal identifying information IDP of 0002 is selected and is notified the storage unit 140 in step S602, the display terminal identifying information IDD in step S603 becomes "no data."

Accordingly, the result of step S604 is negative (N in step S604). In such a case, the dead-or-alive determining procedures for the positioning terminal 10 are not necessary thereafter, and the series of procedures come to an end.

If the dead-or-alive determination result RS is "alive" in step S609 (N in step S609), there is no need to update the information about the corresponding positioning terminal 10 in the storage unit 140, and therefore, the series of procedures come to an end.

Figure 13:
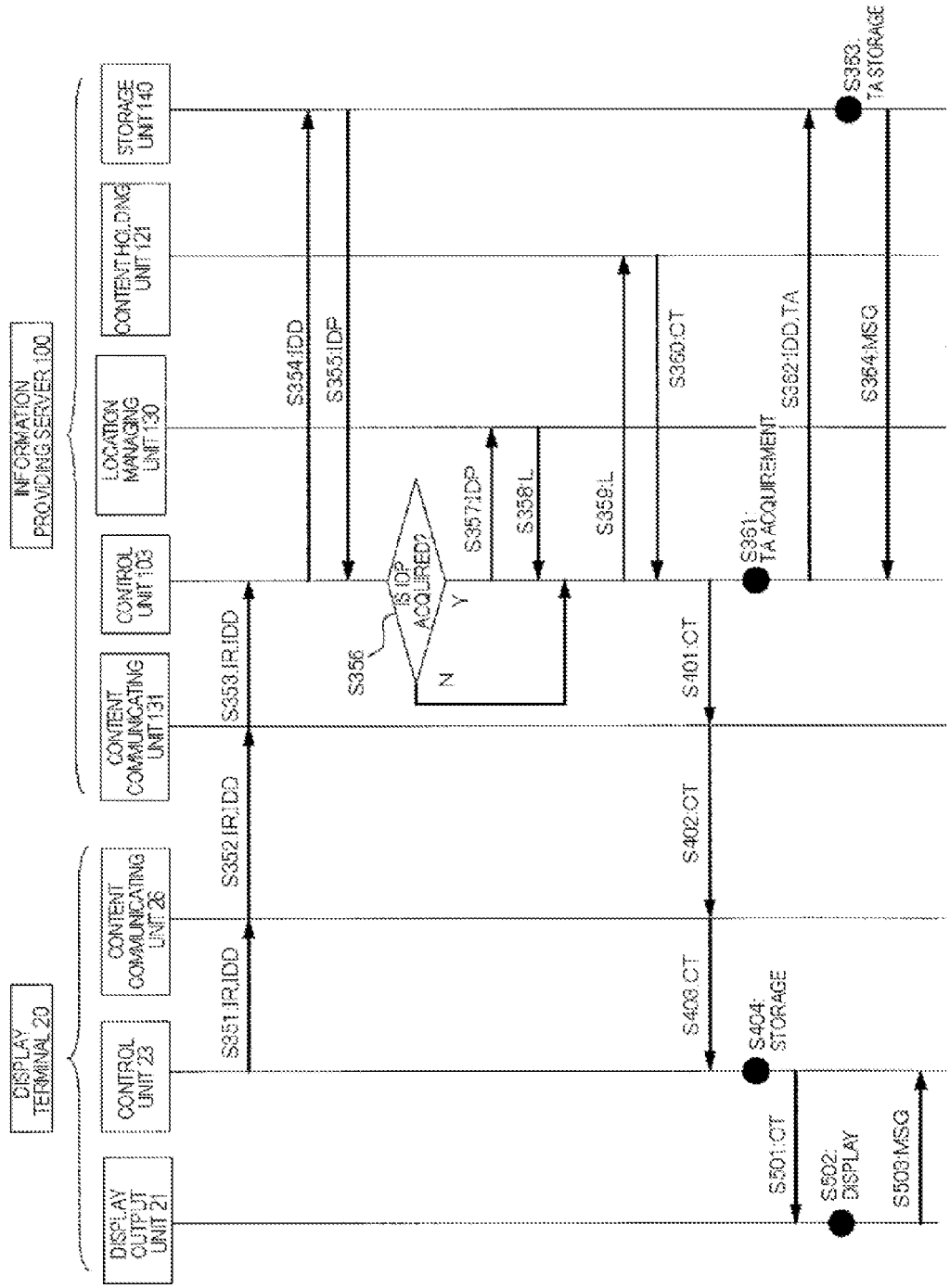
FIG. 13 is a sequence diagram representing a content generating step, a transmitting step, and an outputting step according to the second exemplary embodiment.

FIG. 13 is a sequence diagram representing the content generating step S34, the transmitting step S40, and the outputting step S50 in the information providing system 1000 of this exemplary embodiment.

The content generating step S34 according to this exemplary embodiment includes steps S351 through S364. The transmitting step S40 includes steps S401 through S404, and the outputting step S50 includes steps S501 through S503. The transmitting step S40 and the outputting step S50 are the same as those of the first exemplary embodiment represented in FIG. 7, and therefore, the overlapping description will be omitted.

In the content generating step S34, the control unit 23 of the display terminal 20 transmits the request information IR and the display terminal identifying information IDD to the control unit 103 through the content communicating units 26 and 131 of the display terminal 20 and the information providing server 100 (steps S351 to S353).

Upon receipt of the request information IR, the control unit 103 transmits the display terminal identifying information IDD to the storage unit 140 (step S354), and makes an inquiry as to whether the corresponding link information LK is stored in the link table (see FIG. 10). The storage unit 140 returns the corresponding positioning terminal identifying information IDP (step S355).

If the positioning terminal identifying information IDP is returned (Y in step S356), the control unit 103 determines that the link information LK is "alive." The control unit 103 then transmits the positioning terminal identifying information IDP to the location managing unit 130, and makes an inquiry as to the location L (step S357).

The location managing unit 130 refers to the location table represented in FIG. 3 to read the location L of the corresponding positioning terminal identifying information IDP, and returns the location L to the control unit 103 (step S358).

If the positioning terminal identifying information IDP is not returned from the storage unit 140 in step S355, on the other hand, the control unit 103 determines that the corresponding link information LK is "dead" (N in step S356).

The control unit 103 then notifies the content holding unit 121 of the location L (step S359), and generates and obtains the location-related information CT corresponding to the location L, based on the content table represented in FIG. 2 (step S360).

In the case where the link information LK is determined to be "dead" (N in step S356), the control unit 103 may transmit special data as the location L to the content holding unit 121, and may obtain the location-related information CT indicating that "the display terminal is not registered." from the content holding unit 121, or may obtain an error of a general-purpose function such as the HTTP protocol.

The control unit 103 transmits the location-related information CT to the display terminal 20 (steps S401 through S403), and obtains the access time TA (step S361).

The control unit 103 transmits the obtained access time TA together with the display terminal identifying information IDD to the storage unit 140 (step S362), and updates the link table represented in FIG. 10 by saving the access time TA in a overwrite mode at the corresponding section in the link table (step S363).

The storage unit 140 returns a message MSG indicating that storage of the access time TA has been completed, to the control unit 103.

Through the above operations, the series of procedures of the information providing method including the dead-or-alive determining step S60 according to this exemplary embodiment come to an end.

In this exemplary embodiment, the link information LK containing the positioning terminal identifying information IDP and the display terminal identifying information IDD associated with each other is transmitted from the positioning terminal 10 or the display terminal 20 to the information providing server 100. From the link information LK, the information providing server 100 can recognize that the positioning terminal 10 is associated with the display terminal 20.

The positioning terminal 10 or the display terminal 20 of this exemplary embodiment receives the display terminal identifying information IDD or the positioning terminal identifying information IDP assigned to the portable terminal on the other end, and generates the link information LK by associating the received display terminal identifying information IDD or positioning terminal identifying information IDP with the positioning terminal identifying information IDP or the display terminal identifying information IDD assigned to the positioning terminal 10 or the display terminal 20.

With this structure, the positioning terminal 10 and the display terminal 20 are readily associated with each other by a user. Accordingly, even where the positioning terminal 10 is rented to a user, the user can generate the link information LK about the positioning terminal identifying information IDP and the display terminal identifying information IDD, without any complicated procedures such as manually inputting information.

When the predetermined time comes, the information providing system 1000 of this exemplary embodiment deletes part of or all of the link information LK stored in the storage unit 140. With this arrangement, the location-related information CT is not distributed to the display terminal 20 for a predetermined period of time or longer. Accordingly, after the rental period of the positioning terminal 10 lapses, incorrect distribution of the location-related information CT to the display terminal 20 is prevented.

In the dead-or-alive determining operation (step S607) of this exemplary embodiment, the dead-or-alive determination process may be performed, based on the time elapsed since the latest access time TA, instead of the time elapsed since the reception time TL.

Specifically, a link table that stores the access time TA updated in step S363 of FIG. 13 and the current time TC obtained in step S605 of FIG. 12 can be used (see FIG. 10). The dead-or-alive determination process may be performed as to the link information LK, based on whether the difference between the current time TC and the access time TA exceeds a predetermined period of time.

Accordingly, if there coexist a user who has been using a positioning terminal 10 and a display terminal 20 for a long period of time and a user who has finished using a positioning terminal 10 and a display terminal 20 after a short period of time, only the link information LK about the positioning terminal 10 whose use has been ended can be deleted. Accordingly, incorrect distribution of the location-related information CT to the display terminal 20 that has processed the use of the positioning terminal 10 can be prevented.

Third Exemplary Embodiment

The information providing system 1000 of this exemplary embodiment cancels the link between a positioning terminal 10 and a display terminal 20 associated with each other under predetermined conditions, as in the second exemplary embodiment.

The information providing system 1000 of this exemplary embodiment further includes a storage unit 140 that stores link information LK received by the information providing server 100 and associated with the location L of the positioning terminal 10.

If the location L of the positioning terminal 10 matches a predetermined location, the information providing system 1000 of this exemplary embodiment deletes part of or all of the stored link information LK.

Figure 14:
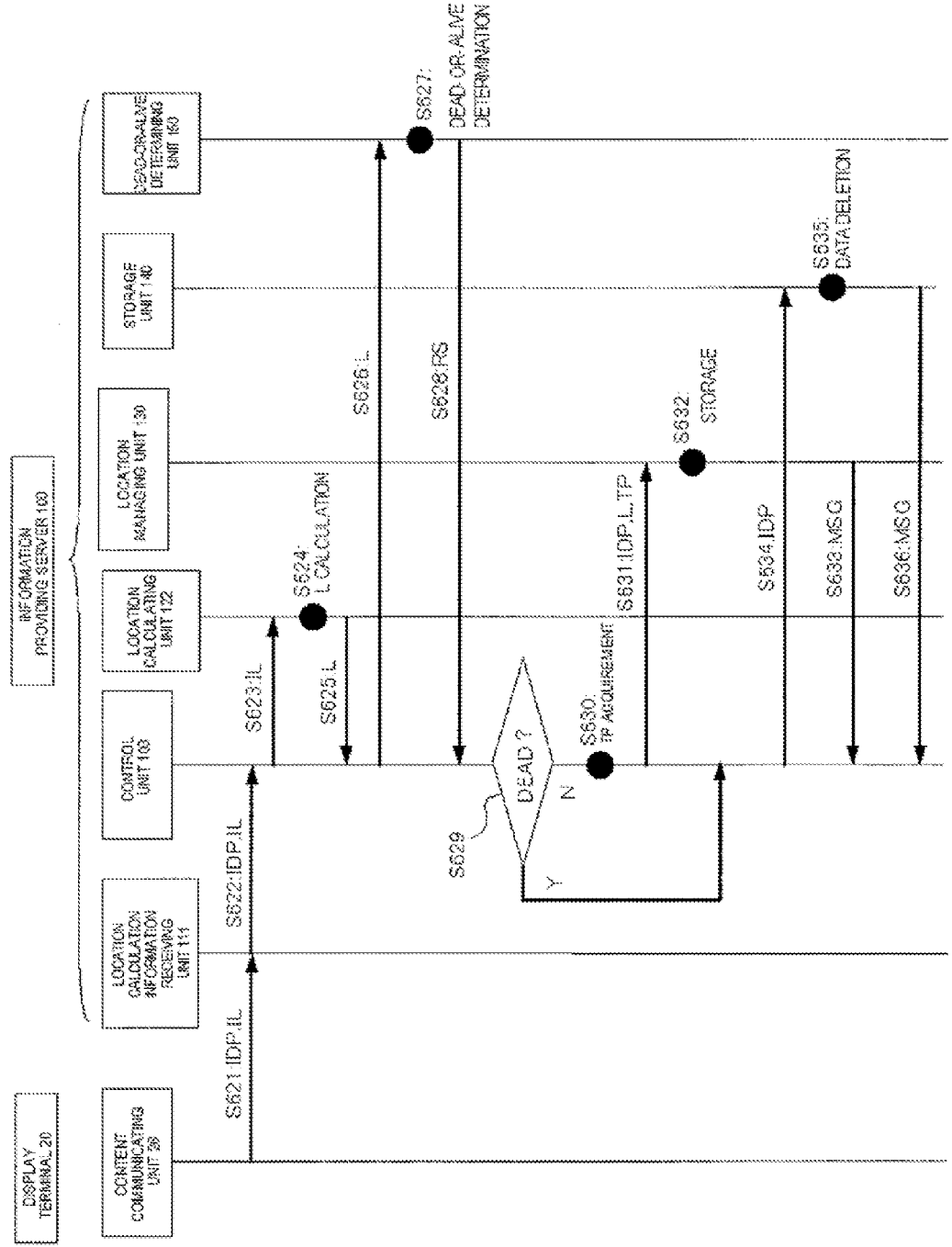
FIG. 14 is a sequence diagram representing a dead-or-alive determining step according to a third exemplary embodiment.

The functional block diagram of the information providing system 1000 of this exemplary embodiment is the same as that of the second exemplary embodiment represented in FIG. 9. FIG. 14 is a sequence diagram representing the dead-or-alive determining step S60 to be carried out in the information providing system 1000 of this exemplary embodiment. As represented in the drawing, the dead-or-alive determining step S60 includes steps S621 through S636.

In this exemplary embodiment, the dead-or-alive determining step S60 is carried out when the location identifying information IL is transmitted from the positioning terminal 10 or the display terminal 20 to the information providing server 100, that is, during the receiving step S20.

The display terminal 20 transmits the positioning terminal identifying information IDP and the location identifying information IL from the content communicating unit 26 to the control unit 103 of the information providing server 100 via the location calculation information receiving unit 111 (steps S621 and S622).

The control unit 103 transmits the location identifying information IL to the location calculating unit 122 (step S623), and calculates the location L of the positioning terminal 10 (step S624). The location calculating unit 122 returns the calculated location L to the control unit 103 (step S625).

After receiving the location L, the control unit 103 transmits the location L to the dead-or-alive determining unit 150 (step S626), and carries out a dead-or-alive determination on the positioning terminal 10 (step S627). The dead-or-alive determination is carried out based on whether the location L of the positioning terminal 10 matches a predetermined location stored beforehand in the dead-or-alive determining unit 150.

A check can be made to determine whether the location L of the positioning terminal 10 matches the predetermined location, from various points of view. For example, the predetermined location may have a certain width. If the location L matches the predetermined location, the positioning terminal 10 is determined to be "DEAD." If the location L does not match the predetermined location, the positioning terminal 10 is determined to be "ALIVE."

For the dead-or-alive determination, there is no need to identify the positioning terminal identifying information IDP. It is only necessary to store the positioning terminal identifying information IDP transmitted from the display terminal 20 in the control unit 103 and to perform the dead-or-alive determination based on the location L in the dead-or-alive determining unit 150.

The dead-or-alive determination result RS is transmitted from the dead-or-alive determining unit 150 to the control unit 103 (step S628). If the result of the dead-or-alive determination on the positioning terminal 10 identified by the location L indicates "alive" (N in step S629), the control unit 103 obtains the location calculation time TP from a time server (not represented) (step S630).

The control unit 103 transmits the location calculation time TP, together with the positioning terminal identifying information IDP and the location L, to the location managing unit 130 (step S631), and stores those into the location table (see FIG. 3) of the location managing unit 130 (step S632). The location managing unit 130 returns a message MSG indicating that storage into the location table has been completed, to the control unit 103 (step S633).

If the result of the dead-or-alive determination on the positioning terminal 10 in step S629 indicates "dead" (Y in step S629), on the other hand, the control unit 103 transmits the positioning terminal identifying information IDP to the storage unit 140 (step S634). The data about the corresponding positioning terminal 10 is then deleted from the link table (see FIG. 10) stored in the storage unit 140 (step S635).

The storage unit 140 returns a message MSG indicating that data deletion has been completed, to the control unit 103. Through the above operations, the series of procedures of the dead-or-alive determining step S60 according to this exemplary embodiment come to an end.

If the location L of a positioning terminal 10 matches a predetermined location, the information providing system 1000 of this exemplary embodiment deletes part of or all of the stored link information LK. With this arrangement, the association between the positioning terminal 10 and the display terminal 20 can be certainly cancelled, when the positioning terminal 10 moves out of a predetermined region or the like. Accordingly, incorrect distribution of the location-related information CT to the display terminal 20 thereafter can be prevented. It should be noted that a dead-or-alive determining method may be implemented by combining this exemplary embodiment and the second exemplary embodiment.

Fourth Exemplary Embodiment

Figure 15:
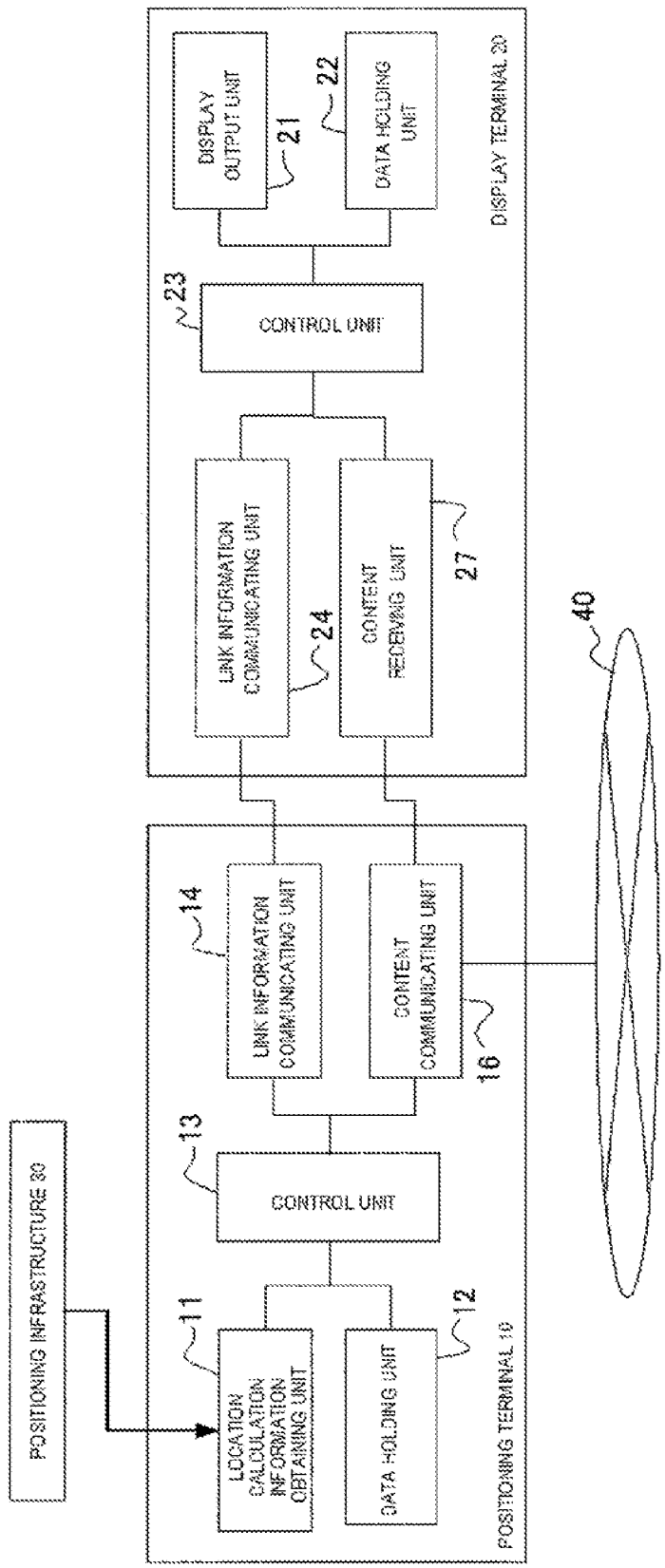
FIG. 15 is a functional block diagram of a positioning terminal and a display terminal used in a fourth exemplary embodiment.

FIG. 15 is a functional block diagram of a positioning terminal 10 and a display terminal 20 used in the information providing system 1000 of this exemplary embodiment. In this exemplary embodiment, the positioning terminal 10 receives the display terminal identifying information IDD from the display terminal 20, and transmits the link information LK and the location identifying information IL to the information providing server 100.

The positioning terminal 10 of this exemplary embodiment differs from that of the first exemplary embodiment (see FIG. 1) in including a content communicating unit 16 that is a communication interface with a network 40, and being connected to the information providing server 100 (not represented in FIG. 15).

The display terminal 20 of this exemplary embodiment differs from that of the first exemplary embodiment in not including a content communicating unit 26 connected to the network 40, but including a content receiving unit 27 in place of the location calculation information receiving unit 25.

That is, in the information providing system 1000 of this exemplary embodiment, the display terminal identifying information IDD stored in the data holding unit 22 is read out by the control unit 23, and is transmitted to the positioning terminal 10 via the link information communicating units 24 and 14.

The control unit 13 of the positioning terminal 10 generates the link information LK from the display terminal identifying information IDD received from the display terminal 20 and the positioning terminal identifying information IDP stored in the data holding unit 12, and transmits the link information LK to the information providing server 100.

The location-related information CT transmitted from the information providing server 100 is received by the content communicating unit 16 of the positioning terminal 10. The received location-related information CT is transferred to the display terminal 20 via the content receiving unit 27, and is displayed and output by the display output unit 21.

In the information providing system 1000 of this exemplary embodiment, the positioning terminal 10 receives the display terminal identifying information IDD from the display terminal 20, and transmits the link information LK and the location identifying information IL to the information providing server 100. Accordingly, the location identifying information IL, which is received by the location calculation information obtaining unit 11 from the positioning infrastructure 30, does not need to be transferred from the positioning terminal 10 to the display terminal 20.

Further, the display terminal 20 does not need to be connected to the network 40. Accordingly, a viewer or a music player that does not have an Internet connecting function can be used as the display terminal 20, as long as it can communicate with the positioning terminal 10 by IrDA or the like.

Fifth Exemplary Embodiment

Figure 16:
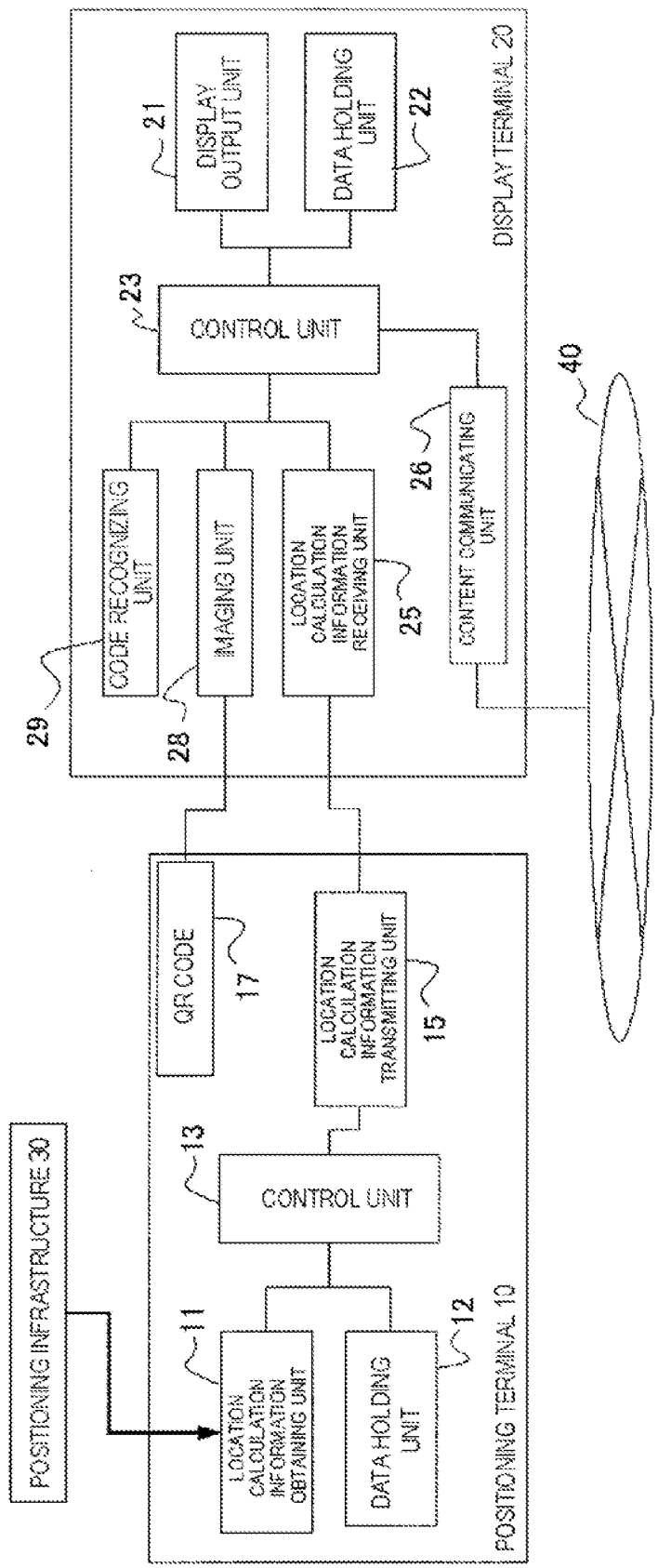
FIG. 16 is a functional block diagram of a positioning terminal and a display terminal used in a fifth exemplary embodiment.

FIG. 16 is a functional block diagram of a positioning terminal 10 and a display terminal 20 used in the information providing system 1000 of this exemplary embodiment. An information code image (a QR code (a registered trademark) 17) indicating the positioning terminal identifying information IDP is displayed on the positioning terminal 10 of this exemplary embodiment.

Meanwhile, the display terminal 20 includes an imaging unit 28 and a code recognizing unit 29 that recognizes the QR code 17 contained in image information obtained by the imaging unit 28. Recognizing the QR code 17 of the positioning terminal 10, the display terminal 20 receives the positioning terminal identifying information IDP.

The display location of the information code image is not particularly limited. The information code image may be printed on the external face of the housing of the positioning terminal 10, or may be displayed on the display unit of the positioning terminal 10. That is, the display terminal 20 of this exemplary embodiment can obtain the positioning terminal identifying information IDP by imaging an information code image shown on the housing or screen of the positioning terminal 10 and recognizing the image.

Although the QR code 17 is taken as an example of the information code image in this exemplary embodiment, it is also possible to use a two-dimensional code such as PDF-417, VeriCode, or MaxiCode, or a one-dimensional code such as a bar code, or characters such as a serial number.

To generate the link information LK associating the positioning terminal 10 and the display terminal 20 with each other, the control unit 23 uses the positioning terminal identifying information IDP obtained by the imaging unit 28 of the display terminal 20 and the display terminal identifying information IDD stored in the data holding unit 22.

At this point, the server address SA of the information providing server 100 (not represented in FIG. 16) is contained in the QR code 17, and the display terminal 20 obtains the positioning terminal identifying information IDP and the server address SA through an image recognition of the code recognizing unit 29.

The link information LK generated by combining the positioning terminal identifying information IDP and the display terminal identifying information IDD is transmitted to the information providing server 100 with the server address SA via the content communicating unit 26 and the network 40, and is registered in the location table (see FIG. 3) of the location managing unit 130.

Meanwhile, the location identifying information IL obtained by the positioning terminal 10 from the positioning infrastructure 30 is transmitted to the display terminal 20 by infrared communication between the location calculation information transmitting unit 15 and the location calculation information receiving unit 25.

The location identifying information IL is transmitted from the content communicating unit 26 to the network 40, and is used by the location calculating unit 122 of the information providing server 100 to identify the location L of the positioning terminal 10. The location-related information CT provided by information providing server 100 is received by the content communicating unit 26 of the display terminal 20, and is displayed and output by the display output unit 21.

Sixth Exemplary Embodiment

Figure 17:
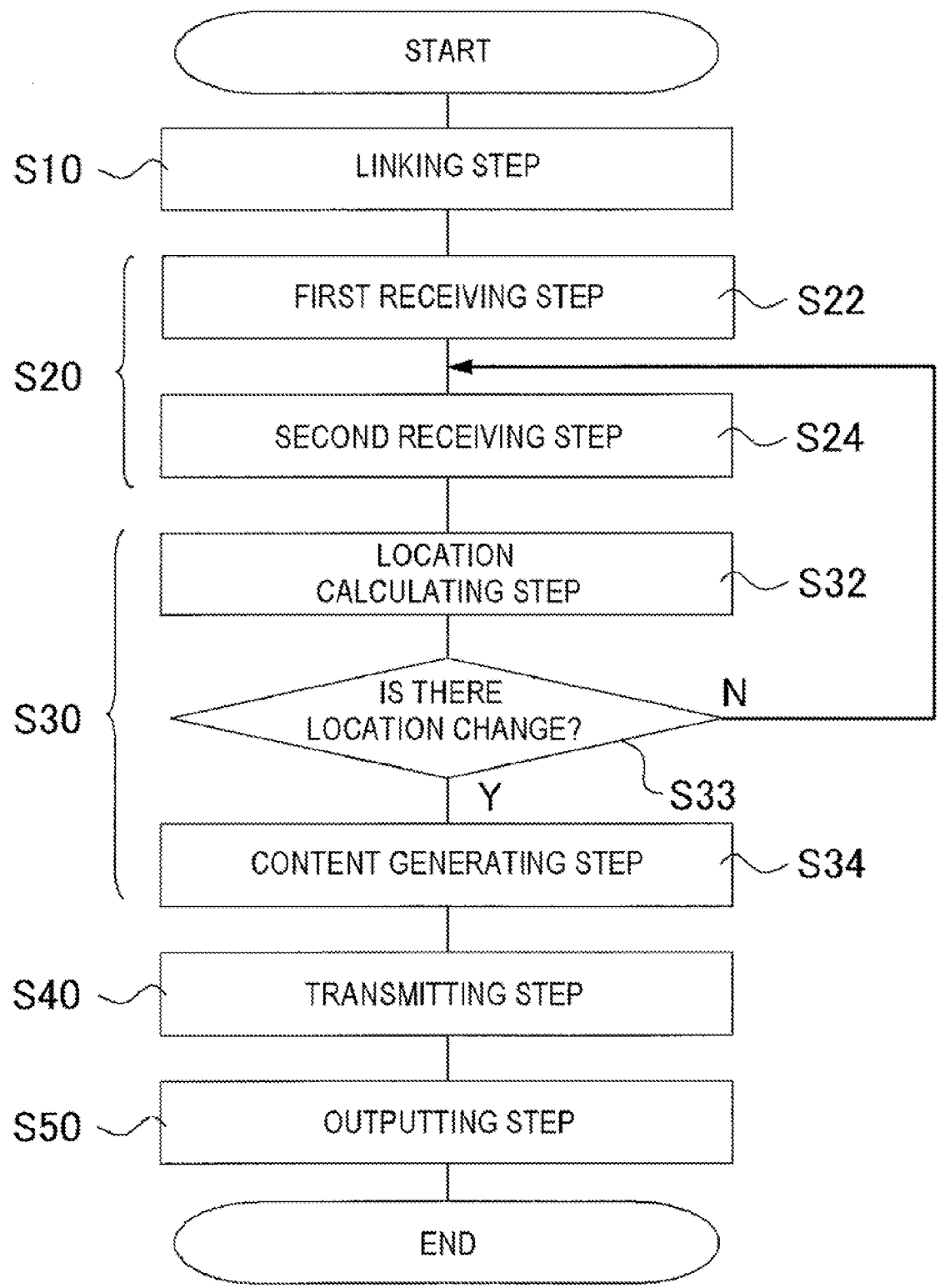
FIG. 17 is a flowchart of an information providing method according to a sixth exemplary embodiment.

FIG. 17 is a flowchart of an information providing method (this method) according to this exemplary embodiment for providing location-related information CT in a so-called push-type manner. The functional block diagram of the information providing system 1000 used in this exemplary embodiment is the same as that of the second exemplary embodiment represented in FIG. 9.

According to this method, in the receiving step S20, first receiving step S22 of receiving link information LK from a positioning terminal 10 or a display terminal 20 is carried out, and second receiving step S24 of receiving location identifying information IL from the positioning terminal 10 or the display terminal 20 is carried out. According to this method, the second receiving step S24 may be carried out more than once.

This method differs from that of the first exemplary embodiment represented in FIG. 4, in that second location-related information CT2 is transmitted to a destination DS in the transmitting step S40 when first location-related information CT1 related to a first location L1 identified by previously received location identifying information IL differs from the second location-related information CT2 related to a second location L2 identified by location identifying information IL received later.

In a case where the first location-related information CT1 differs from the second location-related information CT2, it is not indispensable to determine the difference after the information generating unit 120 actually generates the first location-related information CT1 and the second location-related information CT2.

That is, it is possible to determine whether to make a difference in the generated location-related information CT (the first location-related information CT1 and the second location-related information CT2) by a predetermined amount or more variation of the location L for generating the location-related information CT or the location identifying information IL for identifying the location L.

Therefore, between the second receiving step S24 and the transmitting step S40, this method determines whether there is a change in the location identifying information IL received by the location calculation information receiving unit 111 of the information providing server 100, the location L calculated by the location calculating unit 122 and stored in the location managing unit 130, or the location-related information CT generated by the information generating unit 120, compared with those in the previous step. If there is a change in any of the above information, new location-related information CT is provided to the user.

In this exemplary embodiment, as an example for realizing the above described function, a location change determining step S33 of determining whether there is a change in the location L is carried out between the location calculating step S32 and the content generating step S34.

In this method, the linking step S10, the transmitting step S40, and the outputting step S50 are the same as those of the first exemplary embodiment. The first receiving step S22 of transmitting the link information LK from the display terminal 20 to the information providing server 100 according to this method is carried out through steps S201 through S205 represented in FIG. 6.

Figure 18:
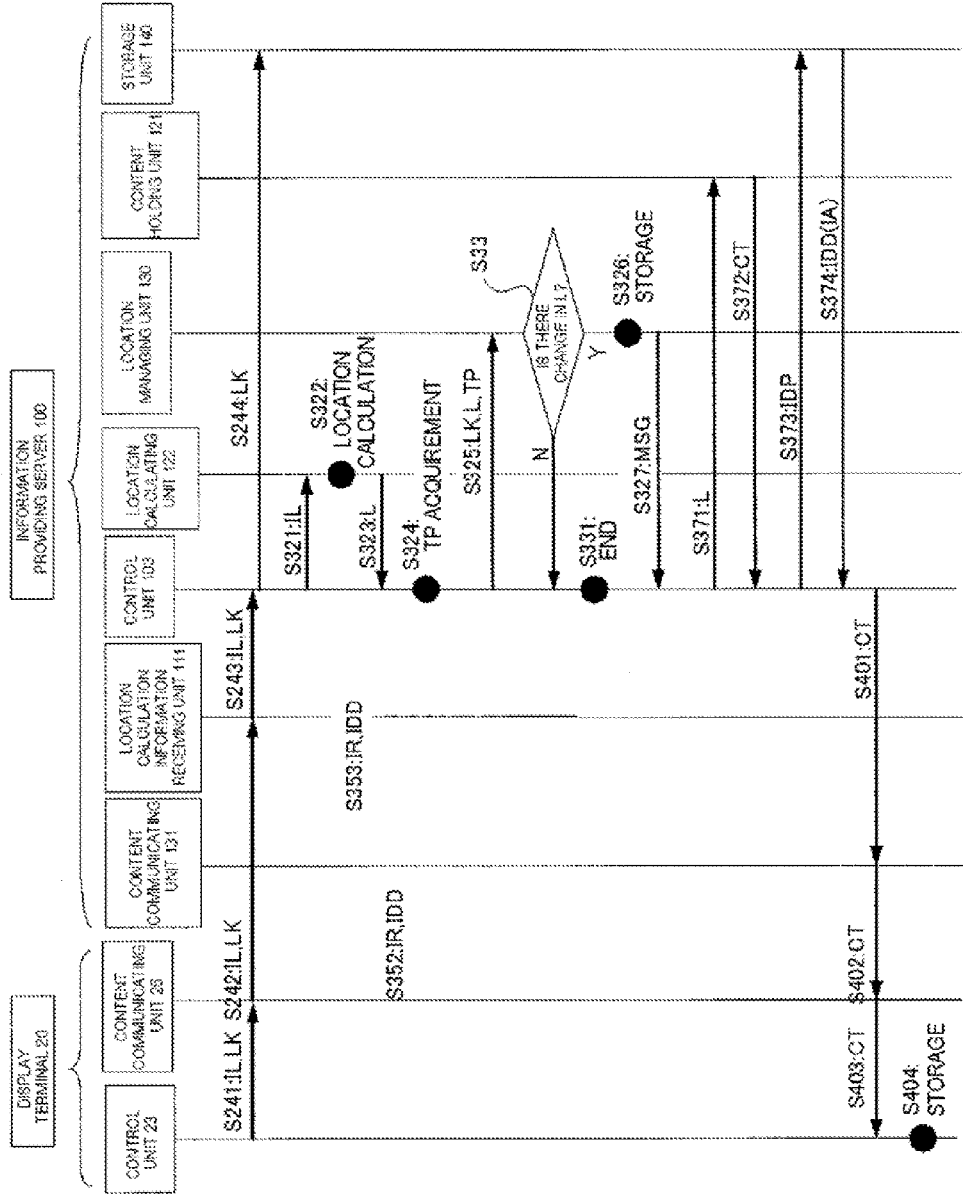
FIG. 18 is a sequence diagram representing a second receiving step, a location calculating step, a location change determining step, a content generating step, and a transmitting step according to the sixth exemplary embodiment.

FIG. 18 is a sequence diagram representing the second receiving step S24, the location calculating step S32, the location change determining step S33, the content generating step S34, and the transmitting step S40 of this method.

The sequence of processes leading from receiving the location identifying information IL in the positioning terminal 10 to transmitting the location identifying information IL to the information providing server 100 in the display terminal 20 receiving that in the second receiving step S24 are the same as steps S201 through S205 of FIG. 6, and therefore, explanation of the sequence will not be repeated.

In the second receiving step S24 of this method, the link information LK and the location identifying information IL are transmitted from the control unit 23 of the display terminal 20 to the control unit 103 via the content communicating unit 26 and the location calculation information receiving unit 111 of the information providing server 100 (steps S241 through S243).

The link information LK to be transmitted and received by this method contains, as the display terminal identifying information IDD, the mail address or telephone number assigned to the display terminal 20. In the receiving step S20 (the second receiving step S24), the receiving unit 110 of the information providing server 100 receives, as the destination designating information IA, the display terminal identifying information IDD contained in the link information LK.

After receiving the link information LK, the control unit 103 stores the destination designating information IA contained in the link information LK into the storage unit 140 (step S244). It should be noted that the link information LK may not be transmitted each time. The location calculating step S32 of this method includes the same steps as steps S321 through S325 of the first exemplary embodiment represented in FIG. 6.

The location managing unit 130, to which the link information LK, the location L, and the location calculation time TP are transmitted from the control unit 103, refers to the last location L stored in the location table (see FIG. 3), to determine whether there is a location change of the positioning terminal 10 (the location change determining step S33).

Here, a location change of the positioning terminal 10 means that there is movement large enough to cause a change in the location-related information CT generated by the information generating unit 120 based on the location L.

If the positioning terminal 10 is determined not to have a location change (N in step S33), the later described content generating step S34 is not carried out. The series of procedures come to an end, and reception of the next location identifying information IL is awaited (step S331).

If the positioning terminal 10 is determined to have a location change (Y in step S33), the location managing unit 130 refers to the link information LK, to update the location table by storing the location L of the corresponding positioning terminal 10 and the location calculation time TP (step S326).

The location managing unit 130 returns a message MSG indicating that the storing process has been completed, to the control unit 103 (step S327). If the result of the location change determining step S33 is positive (Y in step S33), the control unit 103 carries out the content generating step S34.

The content generating step S34 of this method includes steps S371 through S374. The control unit 103 notifies the content holding unit 121 of the location L (step S371), and generates and obtains the location-related information CT (the second location-related information CT2) corresponding to the location L, based on the content table represented in FIG. 2 (step S372).

According to this method, since the location change determining step S33 is carried out, the second location-related information CT2 generated in step S372 differs from the location-related information CT (the first location-related information CT1) previously transmitted to the display terminal 20.

The control unit 103 transmits the positioning terminal identifying information IDP to the storage unit 140 (step S373), and obtains the display terminal identifying information IDD stored in the storage unit 140, namely, the destination designating information IA (step S374).

The location-related information CT obtained by the control unit 103 is transmitted to the display terminal 20, based on the destination designating information IA (the transmitting step S40). The transmitting step S40 includes steps S401 through S404, and is the same as that of the first exemplary embodiment represented in FIG. 7. Therefore, the overlapping description will be omitted.

Figure 19:
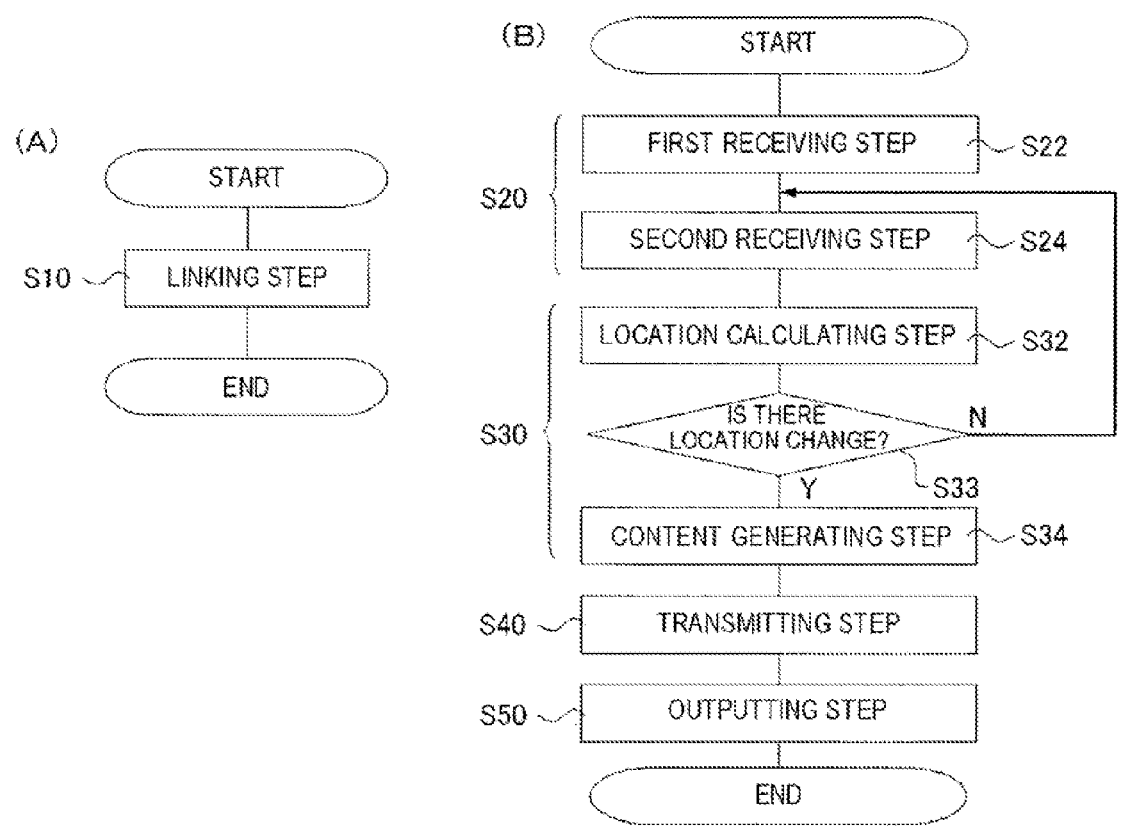
FIGS. 19(A) and 19(B) are flowcharts of a modification of the information providing method according to the sixth exemplary embodiment.

In this exemplary embodiment, the linking step S10 may be carried out independently of the other processes, as in the first exemplary embodiment. FIGS. 19(A) and 19(B) are flowcharts representing a modification of this exemplary embodiment. As represented in the flowcharts, the linking step S10 can be carried out independently of the receiving step S20 through the outputting step S50.

Through the above procedures, one process by the information providing method according to this exemplary embodiment is completed. This method is of a so-called push type. The location identifying information IL is automatically transmitted from a positioning terminal 10 and a display terminal 20 to the information providing server 100 at predetermined time intervals, without request information IR issued from a user.

In this manner, the content prepared in the content holding unit 121 can be thoroughly provided to users. Also, according to this method, only when there is a change in the location-related information CT, the location-related information CT is provided to the display terminal 20. Accordingly, already obtained location-related information CT is not repeatedly transmitted, and the amount of communication data is reduced.

It should be noted that the present invention is not limited to the above described exemplary embodiments, and various changes and modifications may be made to them as long as the object of the present invention can be achieved. For example, in the above described exemplary embodiments, the location-related information CT associating one positioning terminal 10 with one display terminal 20 is received. However, the present invention is not limited to that. One positioning terminal 10 may be associated with a plurality of display terminals 20 each having the display terminal identifying information IDD and a communication interface.

For example, text data and image data contained in the location-related information CT may be output from a display terminal 20 having a viewer function such as a browser, and audio data may be output from a display terminal 20 such as a music player having a playback function.

That is, the link information LK may contain one piece of positioning terminal identifying information IDP associated with two or more pieces of display terminal identifying information IDD. The destination designating information IA is determined for each of the display terminals 20, and is stored into the storage unit 140 of the information providing server 100. Accordingly, when the location identifying information IL about the positioning terminal 10 is transmitted, there is no need to transmit the display terminal identifying information IDD about all the display terminals 20 to the information providing server 100 each time.

This application is the National Phase of PCT/JP2009/005722, filed Oct. 29, 2009, which claims priority based on Japanese patent application No. 2008-283032, filed on Nov. 4, 2008, the entire contents of which are incorporated hereinto by reference.

The invention claimed is:

1. An information providing system comprising:
    a first portable terminal that includes a positioning function and outputs location identifying information for identifying a location;
    a second portable terminal that receives and outputs location-related information that is information related to the location, and does not include the positioning function; and
    an information providing server that provides the location-related information to said second portable terminal, the location-related information being related to the location identified based on the location identifying information input from said first portable terminal,
    wherein said information providing server includes:
        a receiving unit that receives destination designating information for designating a destination to send the location-related information from said first portable terminal, and receives the location identifying information from said first portable terminal;
an information generating unit that generates the location-related information related to the location of said first portable terminal identified by the received location identifying information; and
a transmitting unit that transmits the generated location-related information to the destination, based on the received destination designating information,
wherein said destination designating information is at least one of: information that designates the second portable terminal as the destination; and information that designates other hardware accessible by the second portable terminal as the destination, and
wherein the transmitting unit of the information providing server transmits the location-related information to the destination which is designated by said destination designating information.

2. The information providing system according to claim 1, wherein
first identification information for identifying said first portable terminal is assigned to said first portable terminal,
second identification information for identifying said second portable terminal is assigned to said second portable terminal,
said receiving unit receives link information from one of said first portable terminal and said second portable terminal, the link information containing the first identification information and the second identification information associated with each other, and
said information generating unit generates the location-related information related to the location of said first portable terminal identified by the received first identification information and the location identifying information.

3. The information providing system according to claim 2, further comprising
a storage unit that stores the link information received by said information providing server in the manner associated with reception time of the link information,
wherein part of or all of the stored link information is deleted when predetermined time comes.

4. The information providing system according to claim 2, further comprising
a storage unit storing the link information received by said information providing server in the manner associated with the location of said first portable terminal,
wherein part of or all of the stored link information is deleted when the location of said first portable terminal matches a predetermined location or when the portable terminal moves out of a predetermined region.

5. The information providing system according to claim 2, wherein
one portable terminal of said first portable terminal and said second portable terminal
receives one of the second identification information and the first identification information assigned to said portable terminal on the other end,
generates the link information by relating one of the received second identification information and first identification information to one of the first identification information and the second identification information assigned to said one portable terminal itself, and
transmits the generated link information to said information providing server.

6. The information providing system according to claim 2, wherein
said first portable terminal transmits the location identifying information to said information providing server, and
said second portable terminal receives the first identification information from said first portable terminal, and transmits the link information to said information providing server.

7. The information providing system according to claim 6, wherein said second portable terminal receives the first identification information from said first portable terminal via wireless communication.

8. The information providing system according to claim 6, wherein
said first portable terminal displays an information code image indicating the first identification information,
said second portable terminal includes an imaging unit, and a code recognizing unit that recognizes the information code image contained in image information obtained by said imaging unit, and
said second portable terminal receives the first identification information by recognizing the information code image of said first portable terminal.

9. The information providing system according to claim 2, wherein said first portable terminal receives the second identification information from said second portable terminal, and transmits the link information and the location identifying information to said information providing server.

10. The information providing system according to claim 1, wherein said second portable terminal receives the location identifying information from said first portable terminal, and transmits the location identifying information to said information providing server.

11. The information providing system according to claim 1, wherein
said destination designating information is information that designates at least one of an IP address, a mail address, a telephone number, and a web address assigned to the first portable terminal for access to said location-related information.

12. An information providing method of providing location-related information that is information related to a location, including:
receiving, by an information providing server, location identifying information for identifying the location from a first portable terminal that includes a positioning function and outputs the location identifying information;
receiving, by the information providing server, destination designating information for designating a destination to send the location-related information from the first portable terminal;
generating, by the information providing server, the location-related information related to the location of said first portable terminal identified by the received location identifying information;
transmitting, by the information providing server, the generated location-related information to the destination based on the received destination designating information; and
receiving and outputting, by the information providing server, the transmitted location-related information at a second portable terminal that receives and outputs the location-related information and does not include the positioning function,
wherein said destination designating information is at least one of: information that designates the second portable terminal as the destination; and information that designates other hardware accessible by the second portable terminal as the destination, and wherein said transmitting, by the information providing server, further comprises transmitting the location-related information to the destination which is designated by said destination designating information.

13. The information providing method according to claim 12, further including:

generating link information containing first identification information and second identification information associated with each other, the first identification information being assigned to said first portable terminal and identifying said first portable terminal, the second identification information being assigned to said second portable terminal and identifying said second portable terminal; and receiving the link information from one of said first portable terminal and said second portable terminal, and wherein said generating the location-related information generates the location-related information related to the location of said first portable terminal identified by the received first identification information and the location identifying information.

14. The information providing method according to claim 13, wherein in said generating the link information, one portable terminal of said first portable terminal and said second portable terminal receives one of the second identification information and the first identification information assigned to said portable terminal on the other end, and generates the link information by relating one of the received second identification information and first identification information to one of the first identification information and the second identification information assigned to said one portable terminal itself.

15. The information providing method according to claim 13, wherein said receiving the link information receives the link information from one of said first portable terminal and said second portable terminal, and said receiving the location identifying information receives the location identifying information from one of said first portable terminal and said second portable terminal.

16. The information providing method according to claim 15, wherein said receiving the location identifying information is carried out a plurality of times, and said transmitting the generated location-related information transmits the second location-related information to the destination when first location-related information related to a first location identified by the previously-received location identifying information differs from second location-related information related to a second location identified by the later-received location identifying information.

17. The information providing method according to claim 16, wherein the second identification information is a mail address or a telephone number assigned to said second portable terminal, and said receiving the destination designating information receives the second identification information contained in the link information as the destination designating information.

18. The information providing method according to claim 12, further including receiving request information requesting provision of the location-related information from one of said first portable terminal and said second portable terminal, wherein said generating the location-related information and said transmitting the generated location-related information are carried out based on the request information.

19. The information providing method according to claim 12, wherein said destination designating information is information that designates at least one of an IP address, a mail address, a telephone number, and a web address assigned to the first portable terminal for access to said location-related information.

20. An information providing server comprising:

a processor;

a receiving unit, the receiving unit that receives location identifying information for identify a location from a first portable terminal that includes a positioning function and outputs the location identifying information, and receives destination designating information for designating a destination to send the location-related information from the first portable terminal;

an information generating unit, the information generating unit that generates the location-related information related to the location of said first portable terminal identified by the received location identifying information; and a transmitting unit, the transmitting unit that transmits the generated location-related information to the destination based on the received destination designating information, wherein the destination is a second portable terminal that receives and outputs the location-related information and does not include the positioning function, wherein said destination designating information is at least one of: information that designates the second portable terminal as the destination; and information that designates other hardware accessible by the second portable terminal as the destination, and wherein the transmitting unit transmits the location-related information to the destination which is designated by said destination designating information.

21. The information providing server according to claim 20, wherein said receiving unit receives link information containing first identification information and second identification information associated with each other from one of said first portable terminal and said second portable terminal, the first identification information being assigned to said first portable terminal and identifying said first portable terminal, the second identification information being assigned to said second portable terminal and identifying said second portable terminal, and said information generating unit generates the location-related information related to the location of said first portable terminal identified by the received first identification information and the location identifying information.

22. The information providing server according to claim 20, wherein said destination designating information is information that designates at least one of an IP address, a mail address, a telephone number, and a web address assigned to the first portable terminal for access to said location-related information.

* * * * *